(12) United States Patent  (10) Patent No.: US 8,805,615 B2
Smith, Jr.  (45) Date of Patent: Aug. 12, 2014

(54) LITHOLOGY AND BOREHOLE CONDITION INDEPENDENT METHODS FOR LOCATING TAGGED PROPPANT IN INDUCED SUBTERRANEAN FORMATION FRACTURES

(75) Inventor: Harry D. Smith, Jr., Montgomery, TX (US)

(73) Assignee: CARBO Ceramics Inc., Houston, TX (US)

( * ) Notice: Subject to any disclaimer, the term of this patent is extended or adjusted under 35 U.S.C. 154(b) by 439 days.

(21) Appl. No.: 13/227,949

(22) Filed: Sep. 8, 2011

(65) Prior Publication Data

US 2013/0062057 A1   Mar. 14, 2013

(51) Int. Cl.
| | | |
|---|---|---|
| *G01V 1/40* | (2006.01) | |
| *G01V 5/10* | (2006.01) | |
| *E21B 43/267* | (2006.01) | |
| *E21B 47/00* | (2012.01) | |

(52) U.S. Cl.
CPC ............. *E21B 47/00* (2013.01); *G01V 5/107* (2013.01); *E21B 43/267* (2013.01); *G01V 5/101* (2013.01)
USPC .................................................. 702/8

(58) Field of Classification Search
CPC .......... E21B 47/00; E21B 43/26; G01V 11/00
USPC ..................... 702/6, 8; 166/250.1, 250.12
See application file for complete search history.

(56) References Cited

U.S. PATENT DOCUMENTS

| | | |
|---|---|---|
| 3,240,938 A | 3/1966 | Hall, Jr. |
| 3,492,147 A | 1/1970 | Young et al. |
| 3,586,105 A | 6/1971 | Houston et al. |
| 3,929,191 A | 12/1975 | Graham et al. |
| 3,943,362 A | 3/1976 | Peelman |

(Continued)

FOREIGN PATENT DOCUMENTS

| | | |
|---|---|---|
| CN | 102007267 | 4/2011 |
| WO | WO 2005/103446 | 11/2005 |

(Continued)

OTHER PUBLICATIONS

International Search Report and Written Opinion, issued for PCT/US2012/048939, dated Nov. 5, 2012, 10 pgs.
International Search Report mailed Jun. 1, 2010, by the ISA/US, in connection with International Application No. PCT/US2010/029207.

(Continued)

*Primary Examiner* — John Breene
*Assistant Examiner* — Stephanie Bloss
(74) *Attorney, Agent, or Firm* — Haynes and Boone, LLP

(57) ABSTRACT

Subterranean formation locations/heights of tagged proppant doped with a high thermal neutron capture cross-section material are determined using data obtained from before and after frac logging passes through a well of a logging tool having near and far neutron detectors. Proppant location inaccuracies arising from changes in lithology between a zone of no interest and a proppant-containing formation zone are made, after any required normalization for a between-log change in borehole fluid, using an observed difference between the near/far detector count rate ratios in the two passes to determine a count rate differential correction to be applied to the before frac detector count rate. The corrected before frac count rate log is then overlaid with the after frac count rate log such that suppression in the after frac count rate log relative to the corrected before frac count rate log indicates the presence of proppant.

23 Claims, 19 Drawing Sheets

(56) References Cited

U.S. PATENT DOCUMENTS

| | | | |
|---|---|---|---|
| 4,021,666 | A | 5/1977 | Allen |
| 4,052,613 | A | 10/1977 | Murphy et al. |
| 4,068,718 | A | 1/1978 | Cooke, Jr. et al. |
| 4,078,174 | A | 3/1978 | Goldman |
| 4,092,536 | A | 5/1978 | Smith |
| 4,288,696 | A | 9/1981 | Peelman et al. |
| 4,427,068 | A | 1/1984 | Fitzgibbon |
| 4,440,866 | A | 4/1984 | Lunghofer et al. |
| 4,495,604 | A | 1/1985 | Clavier et al. |
| 4,585,064 | A | 4/1986 | Graham et al. |
| 4,642,460 | A | 2/1987 | Wallace |
| 4,658,899 | A | 4/1987 | Fitzgibbon |
| 4,731,531 | A | 3/1988 | Handke |
| 4,760,252 | A | 7/1988 | Albats et al. |
| 4,825,073 | A | 4/1989 | Smith, Jr. et al. |
| 4,879,181 | A | 11/1989 | Fitzgibbon |
| 4,894,285 | A | 1/1990 | Fitzgibbob |
| 4,926,940 | A | 5/1990 | Stromswold |
| 5,156,804 | A | 10/1992 | Halverson et al. |
| 5,188,175 | A | 2/1993 | Sweet |
| 5,322,126 | A | 6/1994 | Scott, III |
| 5,404,010 | A | 4/1995 | Anderson et al. |
| 5,410,152 | A | 4/1995 | Gadeken |
| 5,441,110 | A | 8/1995 | Scott, III |
| 5,536,938 | A | 7/1996 | Mills et al. |
| 5,572,021 | A | 11/1996 | Heathman et al. |
| 5,635,712 | A | 6/1997 | Scott, III et al. |
| 6,207,953 | B1 | 3/2001 | Wilson |
| 6,389,367 | B1 | 5/2002 | Plasek |
| 6,725,926 | B2 | 4/2004 | Nguyen et al. |
| 7,036,591 | B2 | 5/2006 | Cannan et al. |
| 8,392,120 | B2 * | 3/2013 | McDaniel et al. ............... 702/11 |
| 2006/0192096 | A1 | 8/2006 | Radtke |
| 2007/0011115 | A1 | 1/2007 | Smith, Jr. et al. |
| 2007/0034373 | A1 | 2/2007 | McDaniel et al. |
| 2008/0009425 | A1 | 1/2008 | Pershikova |
| 2009/0205825 | A1 * | 8/2009 | Smith et al. ................. 166/280.1 |
| 2009/0210161 | A1 | 8/2009 | Duenckel et al. |
| 2010/0089571 | A1 * | 4/2010 | Revellat et al. ............ 166/254.2 |
| 2010/0286918 | A1 * | 11/2010 | Moos et al. ...................... 702/12 |
| 2011/0001040 | A1 | 1/2011 | Smith, Jr. et al. |
| 2012/0181020 | A1 * | 7/2012 | Barron et al. .............. 166/250.1 |

FOREIGN PATENT DOCUMENTS

| | | |
|---|---|---|
| WO | WO 2007/019585 | 2/2007 |
| WO | WO 2009/105306 | 8/2007 |
| WO | WO 2010/120494 | 10/2010 |
| WO | WO 2011/162938 | 12/2011 |

OTHER PUBLICATIONS

Written Opinion mailed Nov. 22, 2011, by the ISA/US, in connection with International Application No. PCT/US2010/029207.

International Search Report mailed Feb. 27, 2009, by the ISA/US, in connection with International Application No. PCT/US2009/031878.

Written Opinion mailed Feb. 27, 2009, by the ISA/US, in connection with International Application No. PCT/US2009/031878.

International Preliminary Report on Patentability mailed Sep. 8, 2010, by the IPEA/US, in connection with International Application No. PCT/US2009/031878.

International Search Report mailed Sep. 16, 2011, by the ISA/US, in connection with International Application No. PCT/US2011/039236.

Written Opinion mailed Sep. 16, 2011, by the ISA/US, in connection with International Application No. PCT/US2011/039236.

Office Action mailed Aug. 31, 2010, by the USPTO, in connection with U.S. Appl. No. 12/358,168.

Office Action mailed Apr. 8, 2011, by the USPTO, in connection with U.S. Appl. No. 12/358,168.

Notice of Allowance mailed Sep. 27, 2011, by the USPTO, in connection with U.S. Appl. No. 12/358,168.

Office Action mailed Nov. 28, 2011, by the USPTO, in connection with U.S. Appl. No. 12/425,884.

Examiner Interview Summary mailed Mar. 20, 2012, by the USPTO, in connection with U.S. Appl. No. 12/425,884.

Office Action mailed Dec. 7, 2011, by the USPTO, in connection with U.S. Appl. No. 12/820,576.

Correspondence from foreign counsel regarding Office Action dated Dec. 14, 2011, issued by the Eurasian Patent Office, regarding Eurasian Patent App No. 201001336.

W.E. Schultz et al.; *Experimental Basis for a New Borehole Corrected Pulsed Neutron Capture Logging System (TMD)*; SPWLA Publications.

H.D Smith, Jr. et al.; *Applications of a New Borehole Corrected Pulsed Neutron Capture Logging System (TMD)*; SPWLA Publications.

J.C. Buchanan et al.; *Applications of TMD\* Pulsed Neutron Logs in Unusual Downhole Logging Environments*; SPWLA Publications.

Mark Mulkern et al, A Green Alternative for Determination of Frac Height and Proppant Distribution, SPE 138500, Oct. 12-14, 2010, 9 pages, SPE Eastern Regional Meeting held in Morgantown, West Virginia.

Neutron activation analysis; Wikipedia, 6 pages.

International Preliminary Report on Patentability issued for PCT/US2012/048939 dated Mar. 12, 2014, 7 pages.

\* cited by examiner

| PARA | B₄C | PHI | NEAR | FAR | RATIO | NEAR |
|---|---|---|---|---|---|---|
| | 0% | 28.30 | 8390 | 772 | 10.868 | 8390 |
| | | 14.15 | 11632 | 1511 | 7.698 | 11632 |
| | | 7.10 | 14946 | 2638 | 5.666 | 14946 |
| | | 3.50 | 17792 | 3970 | 4.482 | 17792 |
| | 1% | 28.30 | 7563 | 678 | 11.155 | 7563 |
| | | 14.15 | 10449 | 1300 | 8.038 | 10449 |
| | | 7.10 | 13491 | 2256 | 5.980 | 13491 |
| | | 3.50 | 16441 | 3418 | 4.810 | 16441 |

NEAR RATE VERSUS RATIO SHOWING DISPLACEMENT FROM B₄C DOPING

TO FIG. 11B

LITHOLOGY AND BOREHOLE CONDITION INDEPENDENT METHODS FOR LOCATING TAGGED PROPPANT IN INDUCED SUBTERRANEAN FORMATION FRACTURES

BACKGROUND

The present invention relates to hydraulic fracturing operations, and more specifically to methods for identifying an induced subterranean formation fracture using neutron emission-based logging tools.

In order to more effectively produce hydrocarbons from downhole formations, and especially in formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particles, and the fluid used to pump these solids downhole is usually designed to be sufficiently viscous such that the proppant particles remain entrained in the fluid as it moves downhole and out into the induced fractures. Prior to producing the fractured formations, materials called "breakers", which are also pumped downhole in the frac fluid slurry, reduce the viscosity of the frac fluid after a desired time delay, enabling these fluids to be easily removed from the fractures during production, leaving the proppant particles in place in the induced fractures to keep them from closing and thereby substantially precluding production fluid flow therethrough.

The proppants may also be placed in the induced fractures with a low viscosity fluid in fracturing operations referred to as "water fracs". The fracturing fluid in water fracs is water with little or no polymer or other additives. Water fracs are advantageous because of the lower cost of the fluid used. Also when using cross-linked polymers, it is essential that the breakers be effective or the fluid cannot be recovered from the fracture effectively restricting flow of formation fluids. Water fracs, because the fluid is not cross-linked, do not rely on effectiveness of breakers.

Proppants commonly used are naturally occurring sands, resin coated sands, and ceramic proppants. Ceramic proppants are typically manufactured from naturally occurring materials such as kaolin and bauxitic clays, and offer a number of advantages compared to sands or resin coated sands principally resulting from the compressive strength of the manufactured ceramics and their highly spherical particle configuration.

Although induced fracturing has been a highly effective tool in the production of hydrocarbon reservoirs, there is nevertheless usually a need to determine the interval(s) that have been fractured after the completion of the frac operation. It is possible that there are sub-intervals within the desired fracture interval(s) which were ineffectively fractured, either due to anomalies within the formation or problems within the borehole, such as ineffective or blocked perforations. It is also desirable to know if the fractures extend vertically across the entire desired fracture interval(s), and also to know whether or not any fracture(s) may have extended vertically outside the desired interval. In the latter case, if the fracture has extended into a water-bearing interval, the resulting water production would be highly undesirable. In all of these situations, knowledge of the location of both the fractured and unfractured intervals would be very useful for planning remedial operations in the subject well and/or in utilizing the information gained for planning frac jobs on future candidate wells.

There have been several methods used in the past to help locate the successfully fractured intervals and the extent of the fractures in frac operations. For example, acoustic well logs have been used. Acoustic well logs are sensitive to the presence of fractures, since fractures affect the velocities and magnitudes of compressional and shear acoustic waves traveling in the formation. However, these logs are also affected by many other parameters, such as rock type, formation porosity, pore geometry, borehole fluid, borehole conditions, and presence of natural fractures in the formation. Another previously utilized acoustic-based fracture detection technology is the use of "crack noise", wherein an acoustic transducer placed downhole immediately following the frac job actually "listens" for signals emanating from the fractures as they close after the frac pressure has been relaxed. This technique has had only limited success due to: (1) the logistical and mechanical problems associated with having to have the sensor(s) in place during the frac operation, since the sensor has to be activated almost immediately after the frac operation is terminated, and (2) the technique utilizes the sound generated as fractures close, therefore effective fractures, which are the ones that have been propped open to prevent closure thereof, often do not generate noise signals as easy to detect as the signals from unpropped fractures, which can generate misleading results.

Arrays of tilt meters at the surface have also been previously utilized to determine the presence of subterranean fractures. These sensors can detect very minute changes in the contours of the earth's surface above formations as they are being fractured, and these changes across the array can often be interpreted to locate fractured intervals. This technique is very expensive to implement, and does not generally have the vertical resolution to be able to identify which sub-intervals within the frac interval have been fractured and which have not, nor can this method effectively determine if the fracture has extended vertically outside the desired vertical fracture interval(s).

Microseismic tools have also been previously utilized to map fracture locations and geometries. In this fracture location method, a microseismic array is placed in an offset well near the well that is to be hydraulically fractured. During the frac operations the microseismic tool records microseisms that result from the fracturing operation. By mapping the locations of the mictoseisms it is possible to estimate the height and length of the induced fracture. However, this process is expensive and requires a nearby available offset well.

Other types of previously utilized fracture location detection techniques employ nuclear logging methods. A first such nuclear logging method uses radioactive materials which are mixed at the well site with the proppant and/or the frac fluid just prior to the proppant and/or frac fluid being pumped into the well. After such pumping, a logging tool is moved through the wellbore to detect and record gamma rays emitted from the radioactive material previously placed downhole, the recorded radioactivity-related data being appropriately interpreted to detect the fracture locations. A second previously utilized nuclear logging method is performed by pumping one or more stable isotopes downhole with the proppant in the frac slurry, such isotope material being capable of being activated (i.e., made radioactive) by a neutron-emitting portion of a logging tool run downhole after the fracing process. A spectroscopic gamma ray detector portion of the tool detects and records gamma rays from the resulting decay of the previously activated "tracer" material nuclei as the tool is moved past the activated material. The gamma spectra are subsequently analyzed to identify the activated nuclei, and thus the frac intervals. One or both of these previously utilized nuclear-based techniques for locating subterranean fractures has several known limitations and disadvantages which include:

1. The need to pump radioactive material downhole or to create radioactivity downhole by activating previously non-radioactive material within the well;
2. A requirement for complex and/or high resolution gamma ray spectroscopy detectors and spectral data analysis methods;
3. Undesirably shallow depth of fracture investigation capability;
4. Possible hazards resulting from flowback to the surface of radioactive proppants or fluids;
5. Potential for radioactivity contamination of equipment at the well site;
6. The need to prepare the proppant at the well site to avoid an undesirable amount of radioactive decay of proppant materials prior to performance of well logging procedures;
7. The possibility of having excess radioactive material on the surface which cannot be used at another well;
8. The requirement for specialized logging tools which are undesirably expensive to run;
9. The requirement for undesirably slow logging tool movement speeds through the wellbore; and
10. The need for sophisticated gamma ray spectral deconvolution or other complex data processing procedures.

As can be seen from the foregoing, a need exists for subterranean fracture location detection methods which alleviate at least some of the above-mentioned problems, limitations and disadvantages associated with previously utilized fracture location detection techniques as generally described above.

BRIEF DESCRIPTION OF THE DRAWINGS

FIG. 5A is a graph of near and far detector count rates as a function of the modeled outer radius of the formation containing a fracture. FIG. 5B is a graph of near and far detector count rates modeled for a compensated neutron tool in the "para" orientation, in response to doped proppant located in differential fracture volume elements placed radially outward from the wellbore casing.

FIGS. 6A and 6B show for detectors at three spacings from the source, the decay curve data before (FIG. 6A) and after (FIG. 6B) proppant doped with boron carbide is placed in fractures, together with the computed formation and borehole decay components in both equation and graphical representations. In FIGS. 6A-6C, the upper (highest count rate) decay curves and components are from the near detector, the intermediate decay data is from the far detector, and the lowest count rate decay data is from the xfar detector.

FIG. 7A is an example of a well log obtained from a compensated neutron tool with three thermal neutron detectors (near, far, and xfar detectors respectively carried on the tool at progressively greater distances above its neutron generating portion). A pulsed neutron capture tool with a capture gamma ray detector or a thermal neutron detector would generate a well log similar to FIG. 7B. Under normal logging conditions a pulsed neutron capture tool has at least two detectors, a near detector and a far detector, and each detector generates a well log.

DETAILED DESCRIPTION

Figure 1:
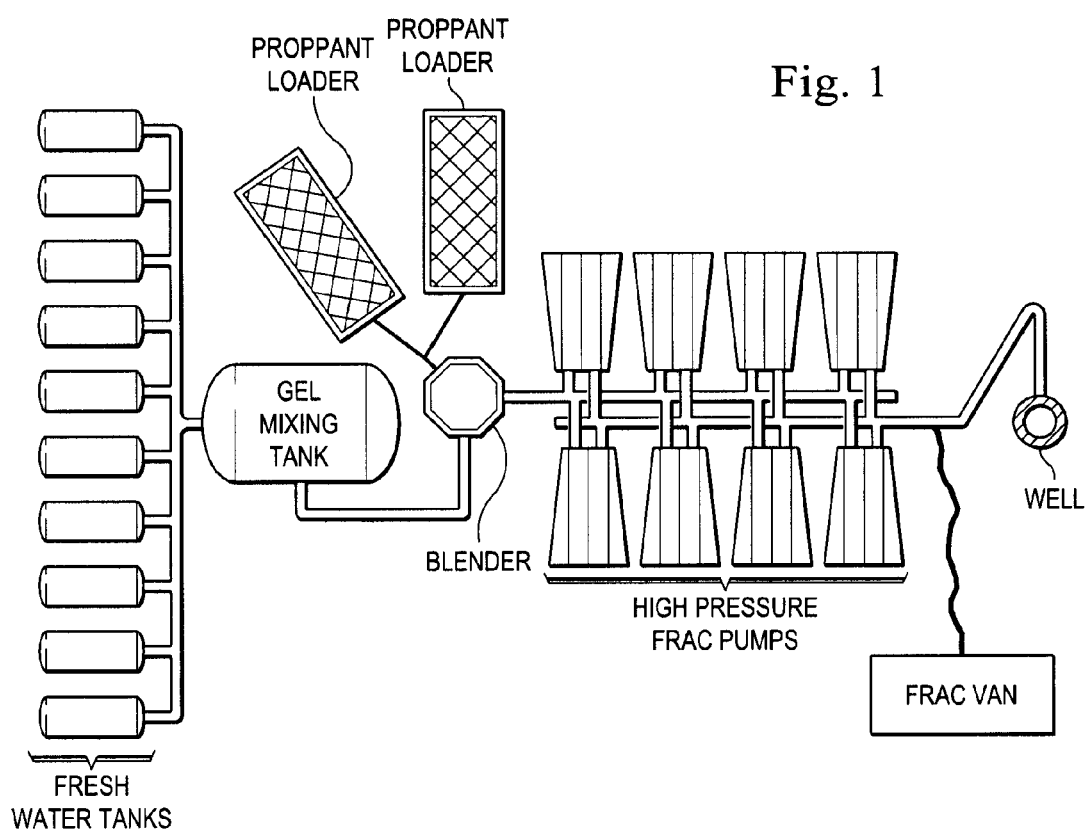
FIG. 1 is a schematic diagram of a wellsite frac layout.

The methods described herein do not use complex and/or high resolution gamma ray spectroscopy detectors. In addition, spectral data analysis methods are not required, and the depth of investigation is deeper than nuclear techniques employing downhole neutron activation. There is no possible hazard resulting from flowback to the surface of radioactive proppants or fluids, nor the contamination of equipment at the wellsite. The logistics of the operation are also very simple: (1) the proppant can be prepared well in advance of the required frac operations without worrying about radioactive decay associated with delays, (2) there are no concerns related to radiation exposure to the proppant during proppant transport and storage, (3) any excess proppant prepared for one frac job could be used on any subsequent frac job, and (4) the logging tools required are widely available and generally inexpensive to run. Also, slow logging speed is not an issue and there is no need for sophisticated gamma ray spectral deconvolution or other complex data processing (other than possible log normalization).

Moreover, the cost of the procedure when using neutron or compensated neutron tools is much lower than methods requiring expensive tracer materials, sophisticated detection equipment, high cost logging tools, or sophisticated data processing.

Embodiments of the present invention include a method for determining the location and height of a fracture in a subterranean formation using a pulsed neutron capture tool ("PNC"), a compensated neutron tool, or a single detector neutron tool. The method includes obtaining a pre-fracture data set, hydraulically fracturing the formation with a slurry that includes a liquid and a proppant in which all or a fraction of such proppant includes a thermal neutron absorbing material, obtaining a post-fracture data set, comparing the pre-fracture data set and the post-fracture data set to determine the location of the proppant, and correlating the location of the proppant to a depth measurement of the borehole to determine the location and height of the fracture.

The pre-fracture and post-fracture data sets are each obtained by lowering into a borehole traversing a subterranean formation, a neutron emitting tool including a continuous or pulsed fast neutron source and one or more thermal neutron or gamma ray detectors, emitting neutrons from the neutron source into the borehole and formation, and detecting in the borehole region thermal neutrons or capture gamma rays resulting from nuclear reactions of the source neutrons with elements in the borehole region and subterranean formation. For purposes of this application, the term "borehole region" includes the logging tool, the borehole fluid, the tubulars in the wellbore and any other annular material such as cement that is located between the formation and the tubular(s) in the wellbore.

According to certain embodiments using a PNC tool, the pre-fracture and post-fracture data sets are used to distinguish proppant in the formation from proppant in the wellbore.

According to an embodiment of the present invention which utilizes a PNC tool, the PNC logging tool generates data that includes log count rates, computed formation thermal neutron capture cross-sections, computed borehole thermal neutron capture cross-sections, and computed formation and borehole decay component count rate related parameters.

According to an embodiment of the present invention which utilizes a compensated neutron tool, the compensated neutron tool is used to determine the location and height of a fracture in a formation and the porosity of the formation. The pre-fracture and post-fracture data sets generated from a compensated neutron tool includes count rates and count rate ratios.

An embodiment of the present invention uses a single detector thermal neutron tool to determine the location and height of a fracture. The pre-fracture and post-fracture data sets generated from a single detector thermal neutron tool include count rates.

According to certain embodiments of the present invention, the pre-fracture and post-fracture data sets are normalized prior to the step of comparing the pre-fracture and post-fracture data sets. Normalization involves adjusting the pre-fracture and post-fracture data for environmental and/or tool differences in order to compare the data sets.

According to certain embodiments of the present invention, the frac slurry includes a proppant containing the thermal neutron absorbing material. The proppant doped with the thermal neutron absorbing material has a thermal neutron capture cross-section exceeding that of elements normally encountered in subterranean formations to be fractured. According to certain embodiments of the present invention, the proppant containing the thermal neutron absorbing material has a macroscopic thermal neutron capture cross-section of at least about 90 capture units, and preferably up to 900 capture units or more. Preferably, the proppant material is a granular ceramic material, with substantially every grain of the proppant material having a high capture cross section thermal neutron absorbing material integrally incorporated therein.

According to yet another embodiment of the present invention, the thermal neutron absorbing material is boron, cadmium, gadolinium, iridium, or mixtures thereof.

Suitable boron containing high capture cross-section materials include boron carbide, boron nitride, boric acid, high boron concentrate glass, zinc borate, borax, and combinations thereof. A proppant containing 0.1% by weight of boron carbide has a macroscopic capture cross-section of approximately 92 capture units. A suitable proppant containing 0.025-0.030% by weight of gadolinium oxide has similar thermal neutron absorption properties as a proppant containing 0.1% by weight of boron carbide. Most of the examples set forth below use boron carbide; however those of ordinary skill in the art will recognize that any high capture cross section thermal neutron absorbing material, such as gadolinium oxide, can be used.

According to certain embodiments of the present invention, the proppant utilized includes about 0.025% to about 4.0% by weight of the thermal neutron absorbing material. According to certain embodiments of the present invention, the proppant includes a concentration of about 0.1% to about 4.0% by weight of a boron compound thermal neutron absorbing material. According to certain embodiments of the present invention, the proppant includes a concentration of about 0.025% to about 1.0% by weight of a gadolinium compound thermal neutron absorbing material.

According to embodiments of the present invention, the proppant may be a ceramic proppant, sand, resin coated sand, plastic beads, glass beads, and other ceramic or resin coated proppants. Such proppants may be manufactured according to any suitable process including, but not limited to continuous spray atomization, spray fluidization, spray drying, or compression. Suitable proppants and methods for manufacture are disclosed in U.S. Pat. Nos. 4,068,718, 4,427,068, 4,440,866, 5,188,175, and 7,036,591, the entire disclosures of which are incorporated herein by reference.

According to certain embodiments of the present invention, the thermal neutron absorbing material is added to the ceramic proppant during the manufacturing process such as continuous spray atomization, spray fluidization, spray drying, or compression. Ceramic proppants vary in properties such as apparent specific gravity by virtue of the starting raw material and the manufacturing process. The term "apparent specific gravity" as used herein is the weight per unit volume (grams per cubic centimeter) of the particles, including the internal porosity. Low density proppants generally have an apparent specific gravity of less than 3.0 g/cc and are typically made from kaolin clay and alumina. Intermediate density proppants generally have an apparent specific gravity of about 3.1 to 3.4 g/cc and are typically made from bauxitic clay. High strength proppants are generally made from bauxitic clays with alumina and have an apparent specific gravity above 3.4 g/cc. A thermal neutron absorbing material may be added in the manufacturing process of any one of these proppants to result in proppant suitable for use according to certain embodiments of the present invention. Ceramic proppant may be manufactured in a manner that creates porosity in the proppant grain. A process to manufacture a suitable porous ceramic is described in U.S. Pat. No. 7,036,591, the entire disclosure of which is incorporated by reference herein. In this case the thermal neutron absorbing material is impregnated into the pores of the proppant grains to a concentration of about 0.025 to about 4.0% by weight.

According to certain embodiments of the present invention, the thermal neutron absorbing material is incorporated into a resin material and ceramic proppant or natural sands are coated with the resin material containing the thermal neutron absorbing material. Processes for resin coating proppants and natural sands are well known to those of ordinary skill in the art. For example, a suitable solvent coating process is described in U.S. Pat. No. 3,929,191, to Graham et al., the entire disclosure of which is incorporated herein by reference. Another suitable process such as that described in U.S. Pat. No. 3,492,147 to Young et al., the entire disclosure of which is incorporated herein by reference, involves the coating of a particulate substrate with a liquid, uncatalyzed resin composition characterized by its ability to extract a catalyst or curing agent from a non-aqueous solution. Also a suitable hot melt coating procedure for utilizing phenol-formaldehyde novolac resins is described in U.S. Pat. No. 4,585,064, to Graham et al, the entire disclosure of which is incorporated herein by reference. Those of ordinary skill in the art will be familiar with still other suitable methods for resin coating proppants and natural sands.

Accordingly, the methods of the present invention may be implemented with ceramic proppant or natural sands coated with or otherwise containing the thermal neutron absorbing material. According to certain embodiments of the present invention, a suitable thermal neutron absorbing material is either boron carbide or gadolinium oxide, each of which has an effective thermal neutron absorbing capacity at a low concentration in tagged proppant or sand. The concentration of such thermal neutron absorbing materials is generally on the order of about 0.025% to about 4.0% by weight of the proppant. For boron compounds such as boron carbide, the concentration is about 0.1% to about 4.0% by weight of the proppant, and for gadolinium compounds such as gadolinium oxide, the concentration is about 0.025% to about 1.0% by weight of the proppant. These concentrations are low enough such that the other properties of the tagged proppant (such as crush strength) are essentially unaffected by the addition of the high capture cross section material. While any high capture cross-section thermal neutron absorbing material may be used in the embodiments of the present invention, in embodiments of the present invention which employ pulsed neutron tools, boron carbide or other boron containing materials may be used because thermal neutron capture by boron does not result in measurable gamma radiation in the detectors in the logging tool. Also, in embodiments of the present invention which employ neutron or compensated neutron tools, gadolinium oxide or other gadolinium containing materials may be used because a smaller amount of the gadolinium-containing tagging material is required relative to boron containing materials. The weight percentage required to produce similar thermal neutron absorption properties for other high thermal neutron capture cross section materials will be a function of the density and molecular weight of the material used, and on the capture cross sections of the constituents of the material.

A manufactured ceramic proppant containing about 0.025% to about 4.0% by weight of a thermal neutron absorbing material can be cost effectively produced, and can provide useful fracture identifying signals when comparing neutron, compensated neutron, or PNC log responses run before and after a frac job. These signals are capable of indicating and distinguishing between the intervals that have and those that have not been fractured and propped.

As shown in FIG. 1, a well site fracturing operation involves blending water with a gel to create a viscous fracturing fluid. The proppant including a thermal neutron absorbing material is added to the viscous fracturing fluid creating a slurry, which is pumped down the well with high pressure pumps. The high-pressure slurry is forced into the fractures induced in the formation, and possibly also into the borehole region adjacent to the fractures. The proppant particles are pumped downhole in a liquid (frac slurry) and into the induced fractures, and also possibly into the borehole region adjacent to the intervals where the fractures have penetrated into the surrounding formations.

Figure 2:
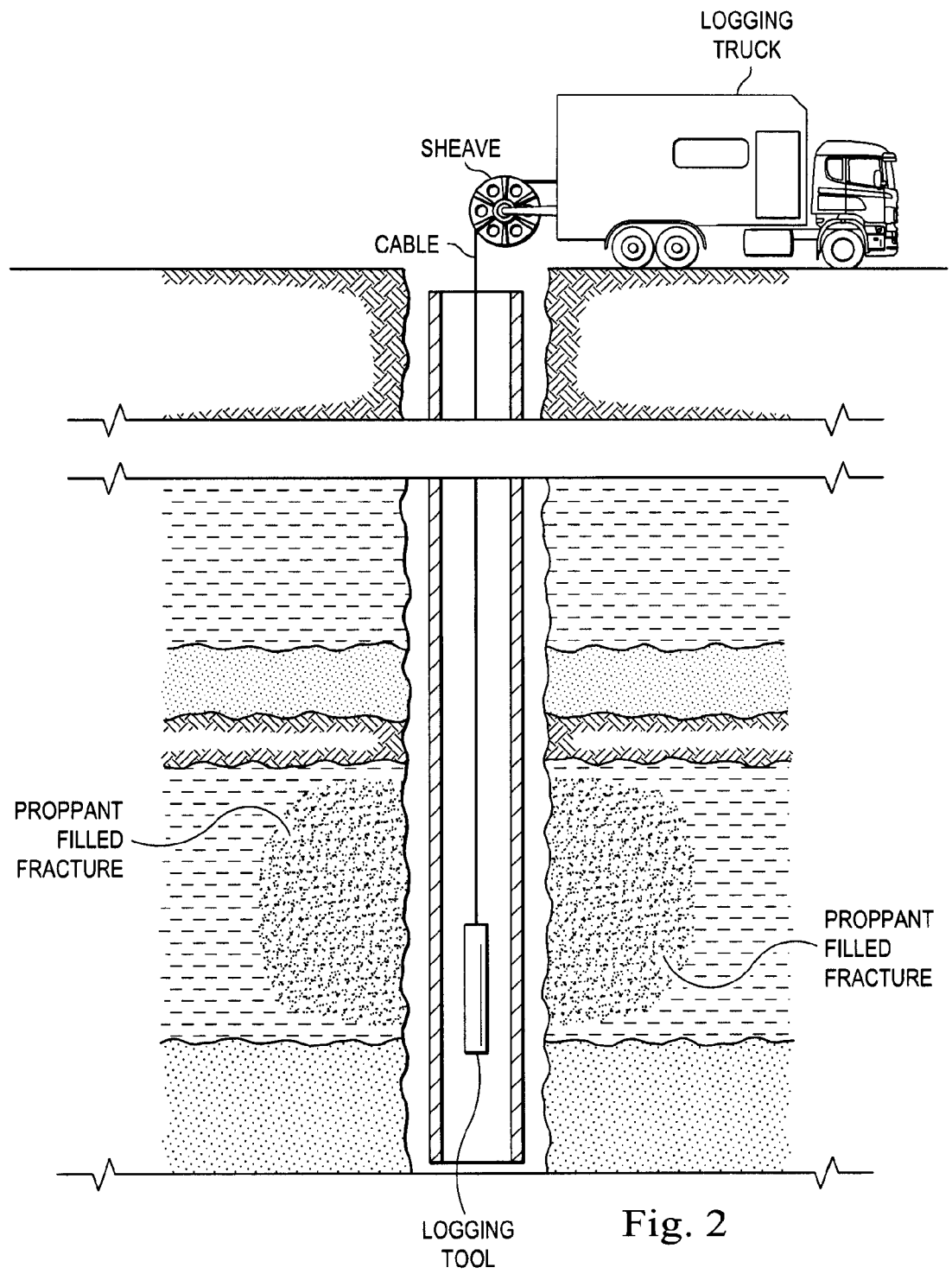
FIG. 2 is a schematic view showing logging of a downhole formation containing induced fractures.

FIG. 2 depicts a logging truck at the well site with a neutron, compensated neutron, or PNC logging tool at the depth of the induced fracture. Power from the logging truck (or skid) is transmitted to the logging tool, which records and transmits logging data as the tool is logged past the fracture interval(s) and the formations above and/or below the interval(s) being fractured.

According to some embodiments of the present invention, the induced hydraulic fracture identification process using a proppant having a thermal neutron absorbing material and measurements from a neutron (including compensated neutron) or pulsed neutron capture (PNC) logging tools includes:

1. Preparing proppant doped with a thermal neutron absorbing material by fabricating the proppant from starting materials that include a thermal neutron absorbing material, by coating the thermal neutron absorbing material onto the proppant or by impregnating or otherwise incorporating the thermal neutron absorbing material into the proppant.

2. Running and recording, or otherwise obtaining, a pre-fracture (also called before-fracture) thermal neutron or compensated neutron log(including single or multiple detector tools), or a PNC log across the potential intervals to be fractured to obtain a pre-fracture data set, and preferably also including depth intervals outside the potential fracture intervals.

3. Conducting a hydraulic fracturing operation in the well, incorporating the proppant having a thermal neutron absorbing material into the frac slurry pumped downhole.

4. Running and recording a post-fracture (also called after-fracture) neutron, compensated neutron, or PNC log (utilizing the same log type as used in the pre-fracture log) across the potential intervals of fracture including one or more fracture intervals to obtain a post-fracture data set, and preferably also including formations outside the interval where fracturing was anticipated. The logs may be run with the tool centered or eccentered within the casing or tubing. The pre-fracture and post-fracture logs are preferably run in the same condition of eccentricity.

5. Comparing the pre-fracture and post-fracture data sets from the pre-fracture and post-fracture logs (after any log normalization), to determine location of proppant. Normalization may be necessary if the pre-fracture and post-fracture logs were run with different borehole fluids present, or if different tools or sources were used. This may be especially true if the pre-fracture log was recorded at an earlier time in the life history of the well, using wireline, memory, and/or logging-while-drilling (LWD) sensors. Normalization procedures compare the log data from intervals preferably outside of the possibly fractured intervals in the pre-fracture and post-fracture logs. Since these intervals have not changed between the logs, the gains and/or offsets are applied to the logs to bring about agreement between the pre-fracture and post-fracture logs in these normalization intervals. The same gains/offsets are then applied to the logs over the entire logged interval. Differences in the data indicate the presence of proppant in the fracture and/or the borehole region adjacent to a fracture.

In a first method for neutron and compensated neutron tools, the observed count rate decreases in the post-fracture log relative to the pre-fracture log indicates the presence of proppant containing a strong thermal neutron absorbing material.

For PNC tools, increases in computed formation and/or borehole capture cross-sections, and decreases in the computed borehole and/or formation component count rates in selected time intervals between the neutron bursts (especially if boron is used as the high capture cross section material), in the post-fracture log relative to the pre-fracture log indicate the presence of proppant containing a thermal neutron absorbing material.

6. Detecting the location and height of the fracture by correlating the differences in data from step (5) to a depth measurement of the borehole. These differences can be measured using well logs, as shown in the exemplary well logs in FIGS. 7A-7B.

Further embodiments of the present invention include changes in the methods described herein such as, but not limited to, incorporating multiple pre-fracture logs into any pre-fracture versus post-fracture comparisons, or the use of a simulated log for the pre-fracture log (such simulated logs being obtained for instance using neural networks to generate simulated neutron, compensated neutron, or PNC log responses from other open or cased hole logs on the well), or the use of multiple stationary logging measurements instead of, or in addition to, data collected with continuous logs.

In additional embodiments of the invention, first and second post-fracture data sets are obtained and utilized to determine the differences, if any, between the quantities of proppant in the fracture intervals before producing a quantity of well fluids from the subterranean formation and the quantities of proppant in the fracture intervals after such production by comparing the post-fracture data sets. The determined proppant quantity differences are utilized to determine one or more production and/or fracture-related characteristics of the subterranean formation such as: (a) one or more of the fractured intervals is not as well propped as it was initially, (b) production from one or more of the fractured intervals is greater than the production from the other fractured intervals, and (c) one or more of the fractured intervals is not producing. This post-fracturing procedure may be carried out using a compensated neutron logging tool or a pulsed neutron capture logging tool, possibly augmented with other wellsite information or information provided by other conventional logging tools, such as production logging tools.

A second method for locating tagged proppant, which is especially well-suited to situations when the hydrogen index of the formation changes between the before-frac and after-frac logs, utilizes the near/far (N/F) ratio and a detector count rate from a post-frac log. This method (which has primary application when using compensated neutron tools, but which can also be used with pulsed neutron tools) utilizes a comparison, for each depth in the well, of a detector count rate determined from the N/F ratio compared with the count rate as actually observed in either the near or far detector. The count rates in both detectors and the N/F ratio are monotonically related to the formation hydrogen index in intervals that do not contain tagged proppant. Therefore, it is possible to develop, for a given formation lithology and/or a given set of borehole conditions (e.g. casing size, casing weight, casing centralization within the borehole, borehole size and eccentricity, cement type and thickness) a direct functional relationship in the non-proppant-containing interval between observed near detector count rate and the N/F ratio (and a corresponding relationship can be developed between the observed far detector count rate and the N/F ratio). This relationship can be developed from regressions based on count rate vs. ratio cross-plots, or using other mathematical techniques well known in the art. This relationship can then be used to predict detector count rates from observed N/F ratios across the entire logged interval of the well with the same or similar borehole conditions as the interval(s) used to develop the count rate vs. ratio relationship. This entire logged interval can include the sub-intervals where tagged proppant may be present. The count rate predicted from the ratio is affected by differences in hydrogen index in formations up and down the wellbore, but is unaffected by high capture cross-section material in proppant, since the ratio itself is unaffected by the presence of the proppant (see FIGS. 8 and 9). The actual measured count rates observed in each detector will be similarly affected by differences in formation hydrogen index, but will also be affected by the presence of tagged proppant (the observed/measured count rate will be suppressed in intervals containing proppant, as discussed earlier). By comparing, via cross-plots or log overlays, the N/F ratio derived count rate with the actual observed count rate, intervals containing tagged proppant can be identified. One nice feature of the method 2 embodiments which utilize the N/F ratio to predict count rates and/or hydrogen indices is that the basic processes can be accomplished without making use of before-frac logs.

Since the N/F ratio is less sensitive to changes in borehole conditions than the detector count rates, it is desirable to develop the relationship between the detector count rate and ratio, as discussed in the paragraph above, in an interval of the well with the same borehole conditions and borehole fluid as are present in the intervals of the well where it is desired to determine if tagged proppant is present. If multiple borehole conditions or borehole fluids are present in different intervals up and down the borehole (such as one interval with gas in the borehole and a deeper interval with liquid in the borehole), it may be desirable to "zone" the well such that each interval of the well with different borehole fluid is treated individually. Locating changes in borehole fluid in the well (for zoning purposes) on the post-frac log can be accomplished by ratio vs. count rate cross-plots, or by comparing count rates on the post-frac log with corresponding count rates on any open hole or pre-frac neutron logs (if available). Within intervals of the well where the borehole fluid is unchanging, it may still be desirable to use an open hole log (e.g. caliper log or density log delta rho curve) or a cement bond log to ensure that the sub-interval(s) where the relationship between the count rate and ratio is developed has similar borehole conditions (e.g. hole dimensions, casing properties, cement conditions) and lithology as the sub-interval(s) of the well where it is desired to know whether or not tagged proppant is present.

Determination of the relationships between count rates and N/F ratios using cross-plots and regression is very sensitive to depth alignment and materially matched filtering of the near and far count rates prior to computing their ratio and constructing these cross-plots. Materially matched filters are designed such that both the near and far count rates respond to the same vertical extent of formation and typically involves filtering the near more than the far. These cross-plots are also sensitive to well conditions as a function of depth since intervals with differing borehole conditions and borehole fluid content (oil, saltwater, gas) will change the cross-plots. After a careful study of near, far, and ratio logs over the complete logging interval, as well as analyses of the casing and drilling records and other well information, ratio vs. observed near or far count-rate cross-plots (and possibly near vs. far observed count-rate cross-plots) are formed for a number of sub-intervals, or zones, of the entire depth interval. Care must be taken to not include the actual fracturing intervals of interest. Each individual zone is evident from these plots when the plotted points within the zone fall along a smooth curve whose scatter reflects only statistical precision (repeatability). Multiple zones in a well can be identified by multiple different smooth curves on cross-plots. The process of subdividing these cross-plots into finer and finer zones is terminated when all the cross-plots of near and far count rates versus ratios involve smooth curves only. Once all the different zones in the logged interval are identified, the relationship between an observed count rate and the N/F ratio in each zone is computed (being careful to exclude sub-intervals where perforations and tagged proppant may be present), and that relationship is used to predict count rates from the ratio in all intervals in the well with the same zonal properties, including any intervals where it is desired to know if tagged proppant is present.

Another factor which may need to be considered in selecting the interval of the well where the relationship between detector count rate and N/F ratio is developed is formation lithology (e.g. sand vs. limestone vs. dolomite). This relationship may be slightly different in formations of different rock types; therefore it may be desirable to select the sub-interval where the count rate-ratio relationship is developed to have the same lithology as the intervals in which it is desired to know whether proppant is present. Lithology can be determined from field information, from data obtained from open-hole logs, from other cased-hole logs on the well, or various combinations of prior well data. Yet another factor which may need to be considered in selecting the interval(s) of the well where the relationship between detector count rate and N/F ratio is developed is formation gas saturation. Due to the well-known excavation effect, there is a slight difference in the response of neutron logs to gas bearing vs. low porosity formations. Therefore, to the degree possible, it may be desirable to select the sub-interval where the count rate-ratio relationship is developed to have formations with the same gas saturations as the intervals in which it is desired to know whether proppant is present. Gas saturation information can be determined from field information, from information obtained by combining selected open hole logs, from other cased hole logs on the well, or by using various combinations of prior well data.

Despite its advantageous elimination of hydrogen index sensitivity, and ability to be performed using only an after frac log, this second proppant detection method utilizing computed count rates developed from the N/F ratio was found to also have limitations related to changes in borehole conditions and/or formation lithology (i.e., the nature of rock structure, such as limestone vs. sandstone) in different formation zones. For instance, if the lithology was different between the zones where the count rate vs. N/F relationship is developed relative to the zones of interest, the lithology change could cause the predicted count rates determined using the after frac log to be in error, since the N/F vs. count rate relationship is a function not only of formation hydrogen index, but also formation lithology and borehole conditions. In paragraphs below, lithology independent and borehole condition independent hydrogen index corrections are discussed. It should be pointed out that similar arguments apply to corrections related to locating tagged proppant in zones with different borehole conditions than the zones where the count rate vs. N/F relationship is developed. As used herein, the terms "lithology independent" and "borehole condition independent" mean that most, but not necessarily all, of these effects have been removed.

One way to minimize a lithology-induced error might be to choose an interval wherein the N/F vs. count rate relationship is developed to have the same lithology as that present in the zones of interest. That, however, requires knowledge of lithology, and even then may not be possible if an interval to develop the relationship cannot be found with the same lithology as the zones of interest. Furthermore, a log comparison overlay of the computed vs. observed after frac logs would look anomalous in the zones where the lithology is different. Similar anomalous behavior would be observed in zones where borehole conditions are different.

To provide a desirable lithology independent hydrogen index correction, a third tagged proppant detection method, which will now be described, was developed. This third method, which is preferably carried out using a compensated neutron logging tool, but which could alternatively be carried out using a pulsed neutron capture type logging tool, incorporates features of both of the above-described first and second methods. Specifically, like the first method (one which uses only before-frac versus after-frac count rate comparisons), both before and after frac logs are required. And like the second method, the N/F ratio is used in the interpretation process (the second method utilizes comparisons of count rates computed from the N/F ratio with observed count rates). The lithology-related problem with the second method is graphically depicted in FIG. 12 in which the N/F vs. count rate relationships are illustrated for two different formation lithologies, labeled lithology #1 (representatively the lithology of a zone of potential fracturing) and lithology #2 (representatively the lithology of a normalization zone which is known to not contain perforations or fractures).

Figure 12:
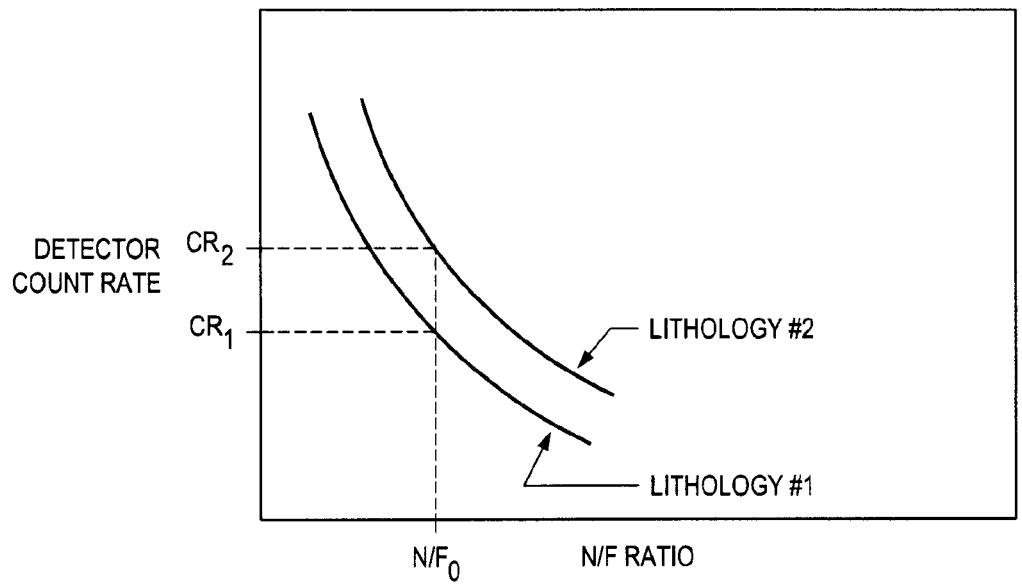
FIG. 12 is a plot of the functional relationship between the thermal neutron count rate measured in one detector in a compensated neutron tool as a function of the near/far detector count rate ratio in the tool for two different formation lithologies—a first lithology in a formation zone of interest from a proppant-containing standpoint, and a second lithology in a formation normalization zone outside of the zone of interest—and graphically depicts a lithology created inaccuracy problem that may be encountered utilizing detector count rates and count rate ratios to detect a location of tagged proppant in a subterranean formation.

As can be seen, for an observed near/far detector count ratio $N/F_o$, as might be observed on the after frac log when using the second method, different computed count rates $CR_1$ and $CR_2$ would be respectively indicated for lithology #1 vs. lithology #2. Although the difference between the two lithologies in FIG. 12 is exaggerated for illustrative clarity, it is clear that if the lithology is different in the zones in a well where the N/F vs. count rate relationship is developed than in a zone of interest, the computed count rate of the second method in the zone of interest will be in error. This will cause the difference between the computed vs. the observed after frac count rates to be affected not only by tagged proppant, but also by the different lithologies as well.

Figure 13:
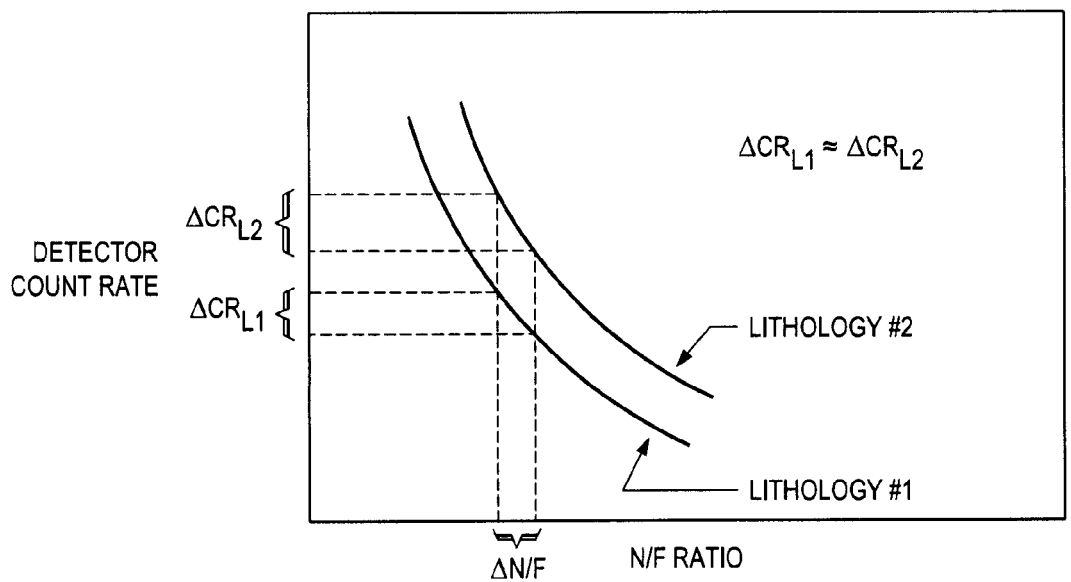
FIG. 13 is a count rate/count rate ratio functional relationship plot similar to that in FIG. 12, but serving to illustrate a lithology independent correction technique based on utilizing a change in count rate ratio in an improved proppant location method embodiment of the present invention.

FIG. 13 illustrates the same two lithology vs. N/F relationships as shown in FIG. 12. However, in FIG. 13 the effect of a change in count rate ratio N/F between two logs (such as between the before and after frac logs) to produce a change in count rates is illustrated. It is to be noted that for a given change in N/F (i.e., $\Delta N/F$), the change in count rate $\Delta CR$ related to $\Delta N/F$ is more or less independent of which lithology is present, since the general shapes of the two curves are similar. Specifically, using a given $\Delta N/F$ between before and after frac logging passes, a projection of $\Delta N/F$ onto the lithology #1 curve yields a $\Delta CR_{L1}$ which is substantially equal to $\Delta CR_{L2}$ resulting from a projection of $\Delta N/F$ onto the lithology #2 curve.

Therefore, in using $\Delta N/F$ and the changes in count rates related to $\Delta N/F$, it is not critical that the lithology in the zone where the N/F vs. count rate relationship (used to compute $\Delta CR$) is developed be the same as that in the zones of interest. In a fractured interval of interest in a well, if a comparison is made of the difference in N/F between a before frac log and an after frac log, this difference, $\Delta N/F=N/F$ (before frac)–N/F (after frac), will be due to a change in formation hydrogen index between the two logs, and will be substantially insensitive to the presence or absence of tagged proppant. $\Delta N/F$ is independent of tagged proppant since it is derived from two N/F measurements, each of which is independent of tagged proppant. $\Delta N/F$ is also more or less independent of the lithology in the zone of interest for reasons described above. Since $\Delta CR_{L1}$ is approximately equal to $\Delta CR_{L2}$ at each depth in the well, $\Delta CR_{L1} \approx \Delta CR_{L2} = \Delta CR$ represents the change in count rate between the before and after frac log that relates to hydrogen index changes between the logs. This $\Delta CR$ can be combined with the before frac (or after frac) count rate log data, such that the resulting before and after frac logs, when compared, have had any differences related to changes in hydrogen index accurately removed, regardless of formation lithology. Remaining differences between the logs (lower count rates on the after-frac log) is indicative of the presence of tagged proppant. The method described above utilizing $\Delta N/F$ to locate tagged proppant is called method three.

According to certain embodiments of the thermal neutron logging method, fast neutrons are emitted from a neutron source into the wellbore and formation, and are rapidly thermalized to thermal neutrons by elastic and inelastic collisions with formation and borehole region nuclei. Elastic collisions with hydrogen in the formation and the borehole region are a principal thermalization mechanism. The thermal neutrons diffuse in the borehole region and the formation, and are eventually absorbed by one of the nuclei present. Generally these absorption reactions result in the almost simultaneous emission of capture gamma rays; however, absorption by boron is a notable exception. The detectors in the logging tool either directly detect the thermal neutrons that are scattered back into the tool (in most neutron and compensated neutron tools, and also in some versions of PNC tools), or indirectly by detecting the gamma rays resulting from the thermal neutron absorption reactions (in some versions of neutron and compensated neutron tools, and in most commercial versions of PNC tools). Most compensated neutron and PNC tools are configured with a neutron source and dual detectors arranged above the neutron source which are referred to herein as a "near" detector and a "far" detector. According to embodiments of the present invention, compensated neutron and pulsed neutron capture tools may be used that include one or more detectors. For example, suitable compensated neutron and PNC tools incorporate a neutron source and three detectors arranged above the neutron source, which are referred to herein as the near, far, and "extra-far" or "xfar" detectors such that the near detector is closest to the neutron source and the xfar detector is the farthest away from the neutron source. It is also possible that one or more of the neutron detectors may be located below the neutron source.

A compensated neutron tool also computes the ratio of near-to-far detector count rates. The porosity (hydrogen index) of the formation can be determined from these count rates and the near-to-far detector count rate ratios.

A pulsed neutron capture tool logging system measures the decay rate (as a function of time between the neutron pulses) of the thermal neutron or capture gamma ray population in the formation and the borehole region. From this decay rate curve, the capture cross-sections of the formation $\Sigma_{fm}$ (sigma-fm) and borehole $\Sigma_{bh}$ (sigma-bh), and the formation and borehole decay components can be resolved and determined. The higher the total capture cross-sections of the materials in the formation and/or in the borehole region, the greater the tendency for that material to capture thermal neutrons. Therefore, in a formation having a high total capture cross-section, the thermal neutrons disappear more rapidly than in a formation having a low capture cross-section. This appears as a steeper slope in a plot of the observed count rate versus time.

Figure 7A:
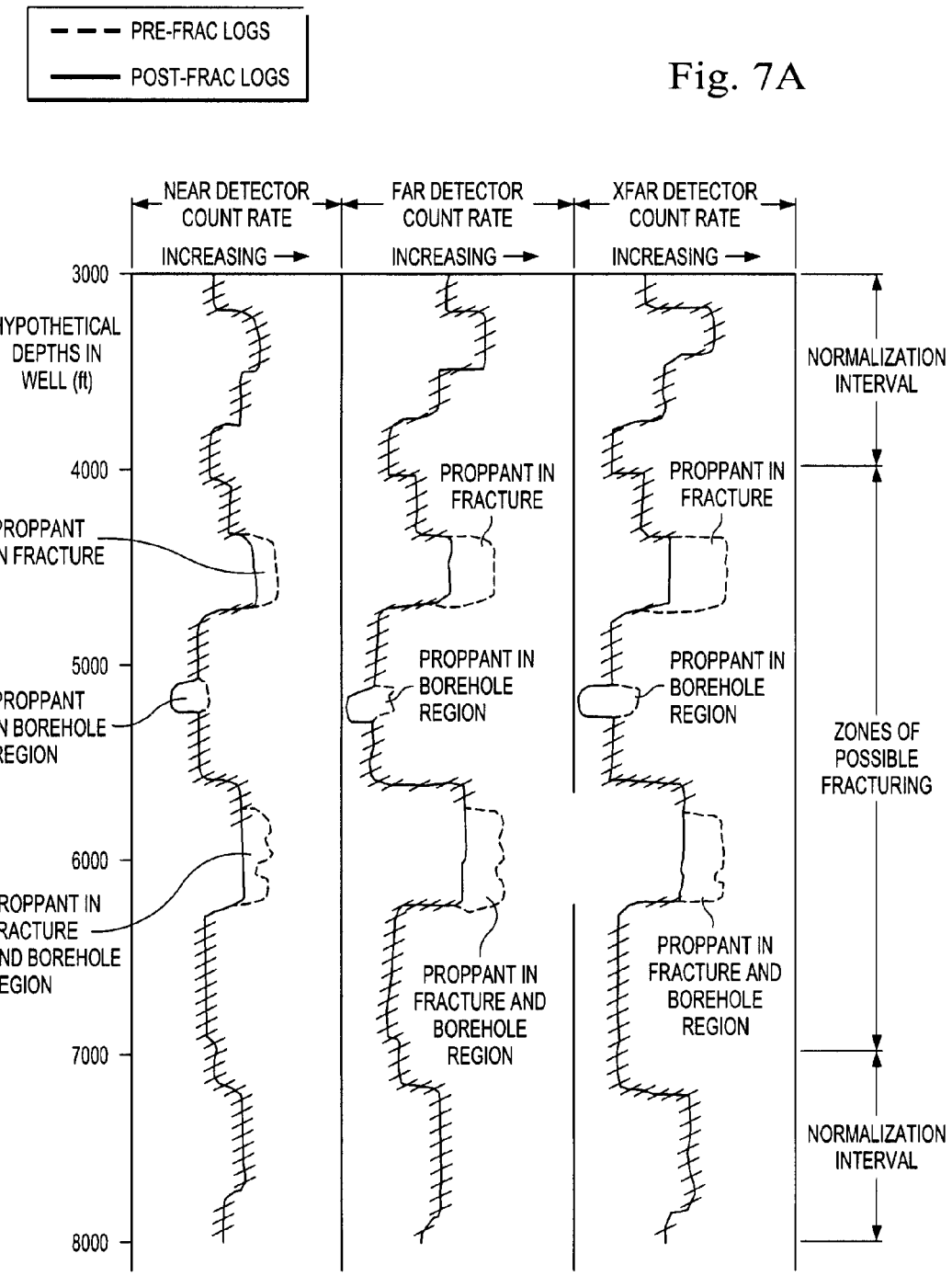
FIGS. 7A-7B are exemplary well logs for identification of proppant in the formation and the borehole region.
Figure 7B:
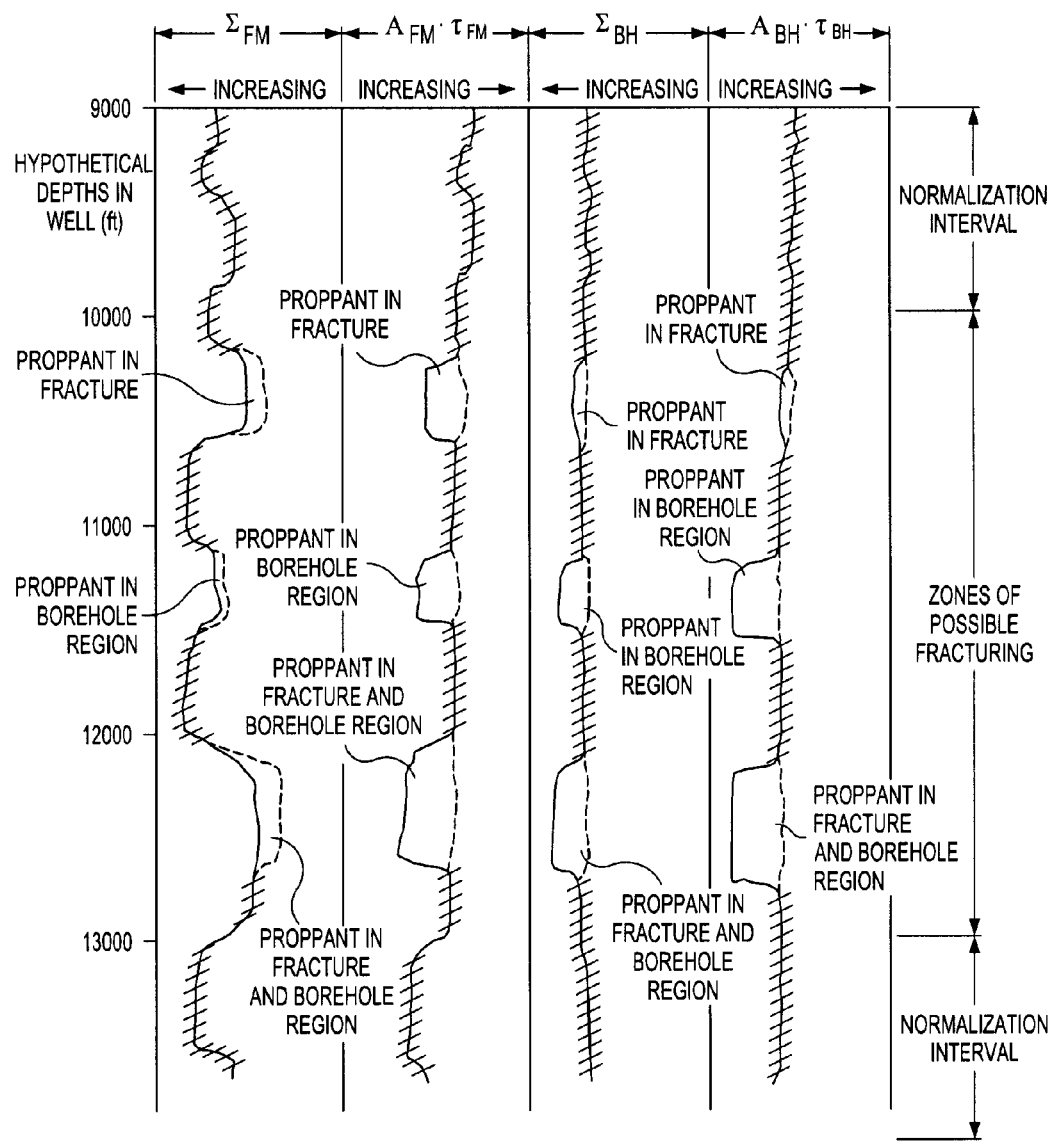

The differences between the PNC borehole and formation pre-fracture and post-fracture parameters can be used to distinguish proppant in the formation from proppant in the wellbore, as shown in the exemplary FIG. 7B.

The data used to generate FIGS. 4A to 5B and Tables 1-4 was modeled using neutron or compensated neutron tools employing thermal neutron detectors, such as $He^3$ detectors. It will be understood that it would also be possible to employ corresponding processing for these tools using gamma ray sensing detectors, or detectors which sense both neutrons and gamma rays. The PNC data used to generate FIGS. 6A to 6C was modeled using tools employing gamma ray detectors. A capture gamma ray detector measures gamma rays emitted after thermal neutrons are captured by elements in the vicinity of the thermal neutron "cloud" in the wellbore and formation. However, the capture of a thermal neutron by boron does not result in a gamma ray being emitted. Therefore, if proppant doped with boron is present, the count rate decreases observed in compensated neutron or PNC tools employing gamma ray detectors will be accentuated relative to tools with thermal neutron detectors. This is because not only will the gamma ray count rate decreases due to increased neutron absorption be observed, but also additional decreases due to the fact that only the non-boron neutron captures would result in detectable gamma ray events.

The following examples are presented to further illustrate various aspects of the present invention, and are not intended to limit the scope of the invention. The examples set forth below, with the exception of the exemplary well logs shown in FIGS. 7A-7B, were generated using the Monte Carlo N-Particle Transport Code version 5 (hereinafter "MCNP5"). The MCNP5 is a software package that was developed by Los Alamos National Laboratory and is commercially available within the United States from the Radiation Safety Information Computation Center (http://www-rsicc.ornl.gov). The MCNP5 software can handle geometrical details and accommodates variations in the chemical composition and size of all modeled components, including borehole fluid salinity, the concentration of the thermal neutron absorbing material in the proppant in the fracture, and the width of the fracture. The MCNP5 data set forth below resulted in statistical standard deviations of approximately 0.5-1.0% in the computed count rates.

In most of the following examples, the proppant was doped with boron carbide; however other suitable thermal neutron absorbing materials, such as gadolinium oxide, may be used. Preferably, the proppant is a granular ceramic material into substantially every grain of which the dopant is integrally incorporated.

Figure 3A:
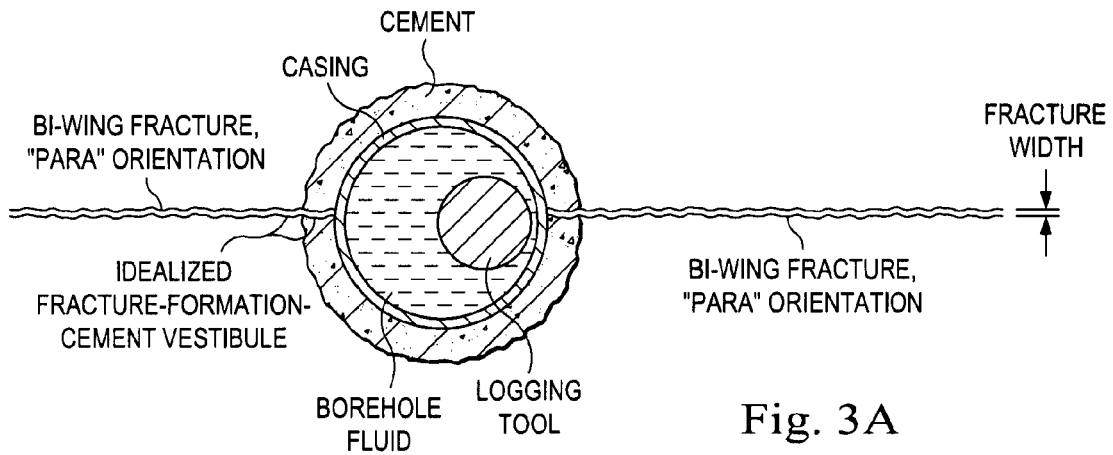
FIGS. 3A and 3B are plan views from the orientation of the Z-axis with respect to "para" and "perp" tool placement geometries relative to the fracture.
Figure 3B:
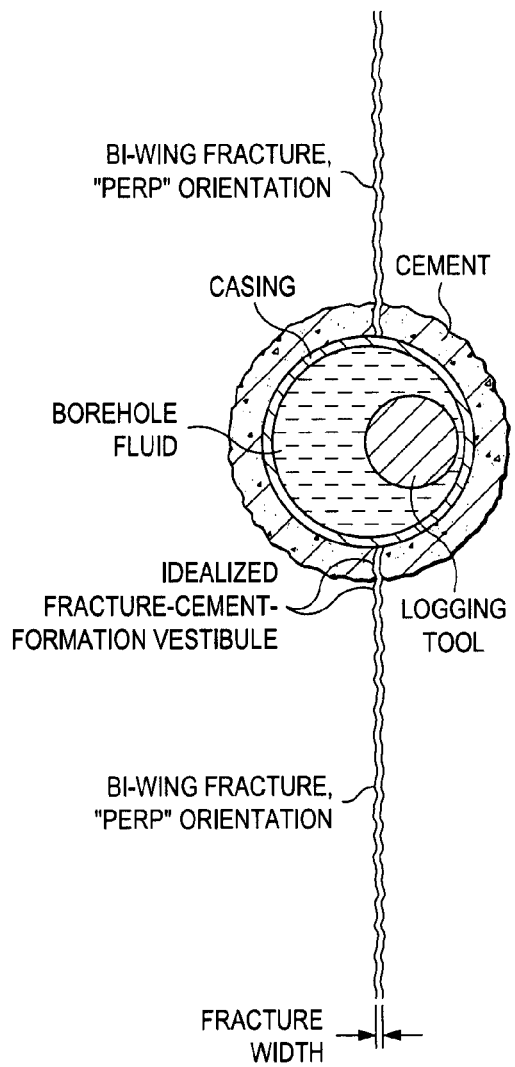
Figure 4A:
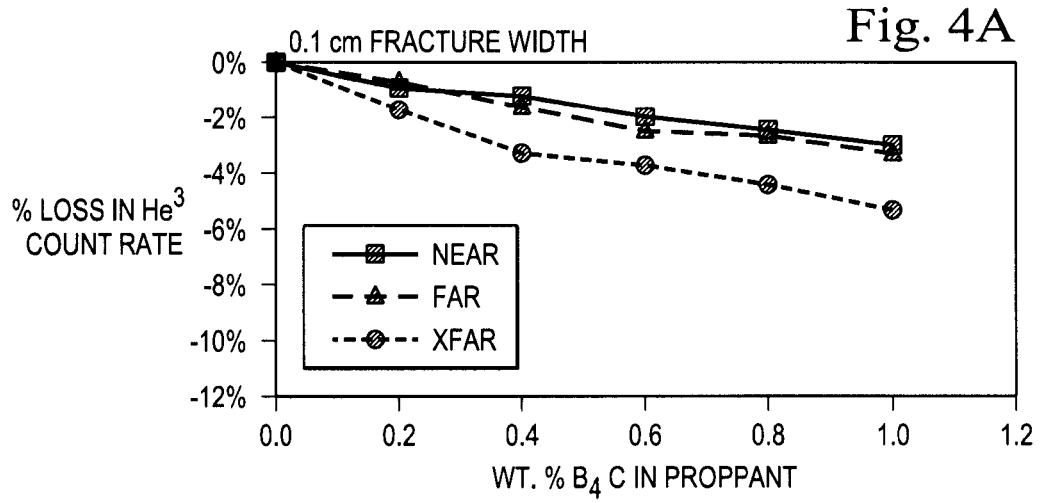
FIGS. 4A-4F are graphs of three detectors modeled at different locations (near, far, xfar) on a compensated neutron tool showing neutron count rate sensitivity as a function of fracture width and boron carbide ($B_4C$) concentration in proppant.
Figure 4B:
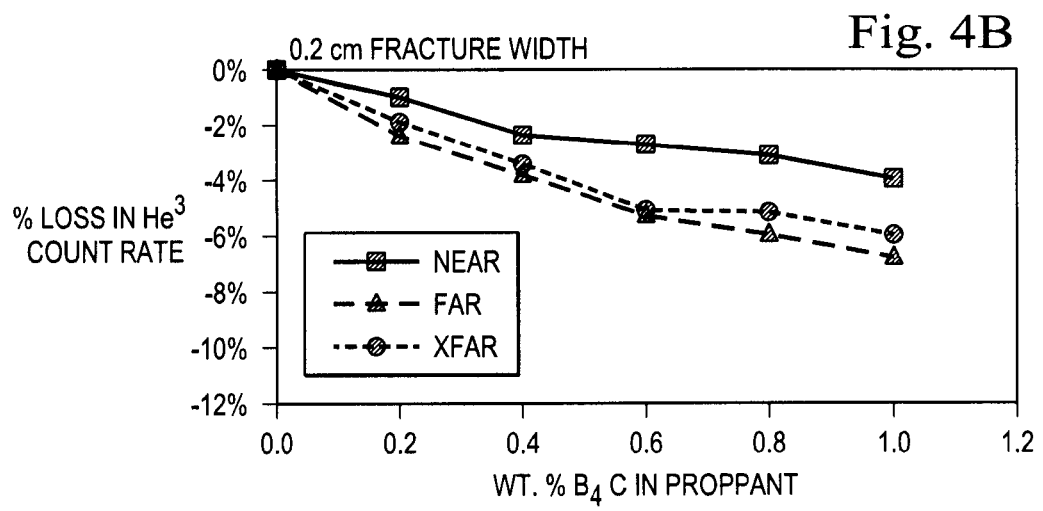
Figure 4C:
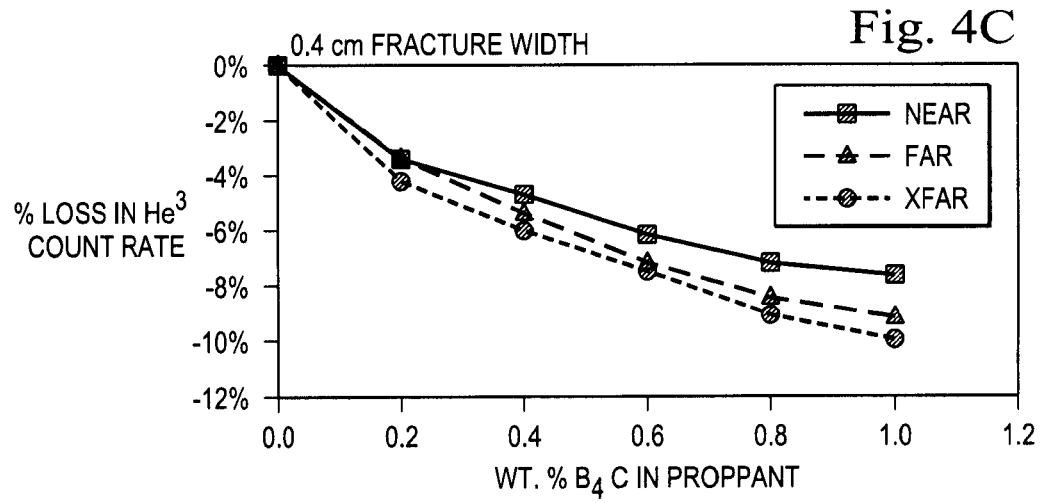
Figure 4D:
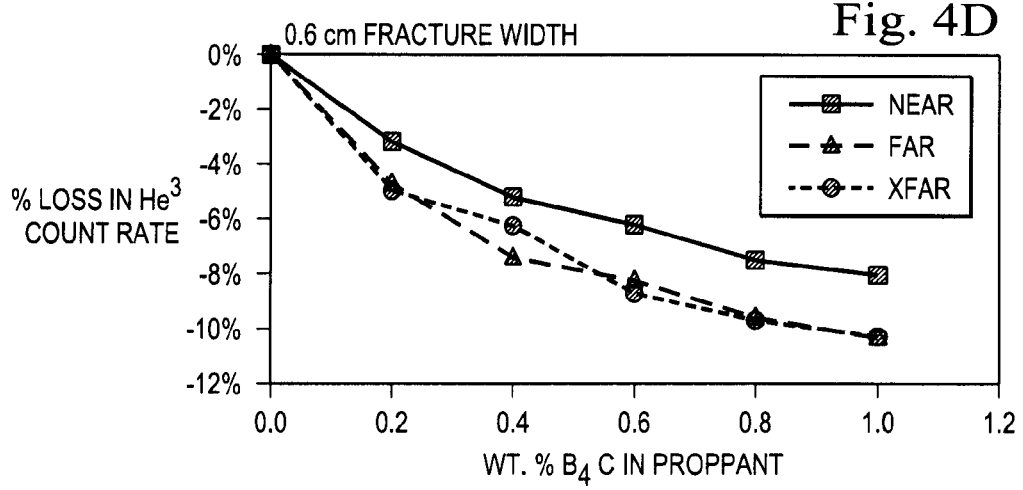
Figure 4E:
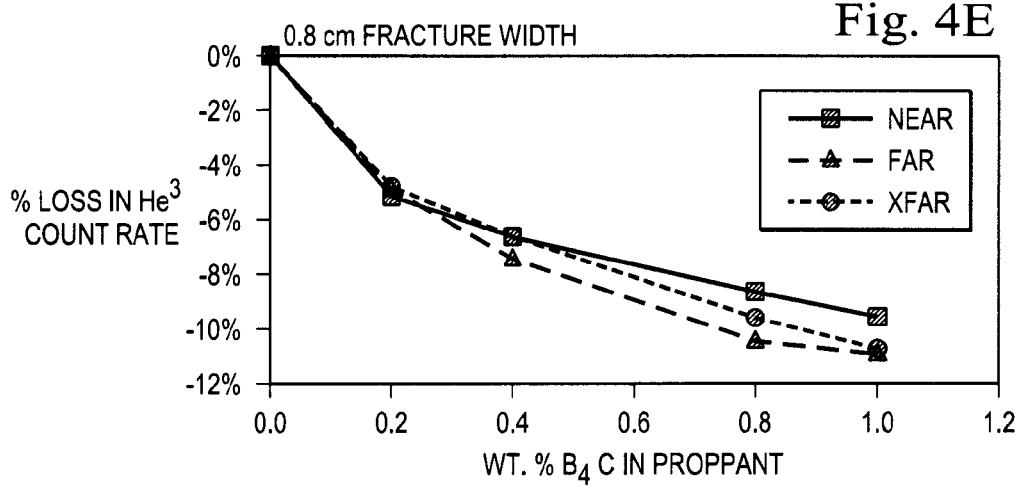
Figure 4F:
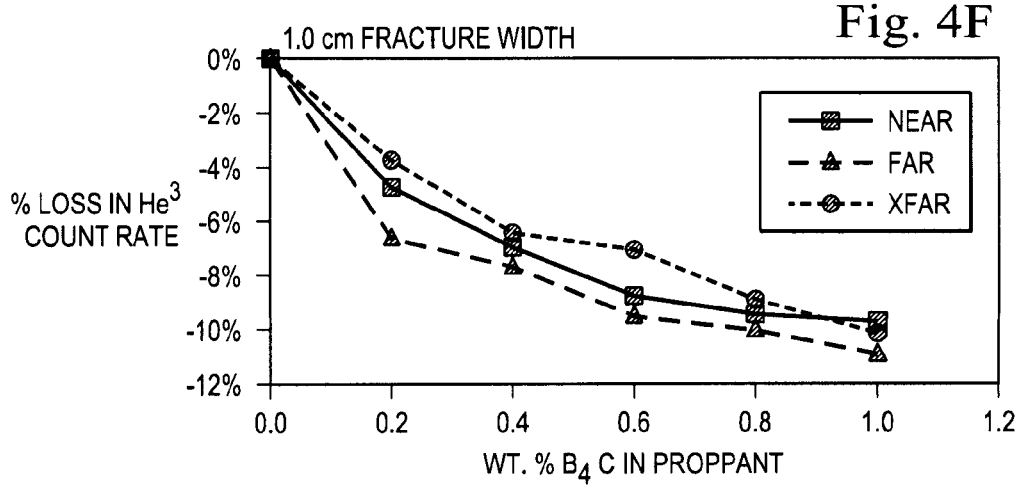
Figure 4G:
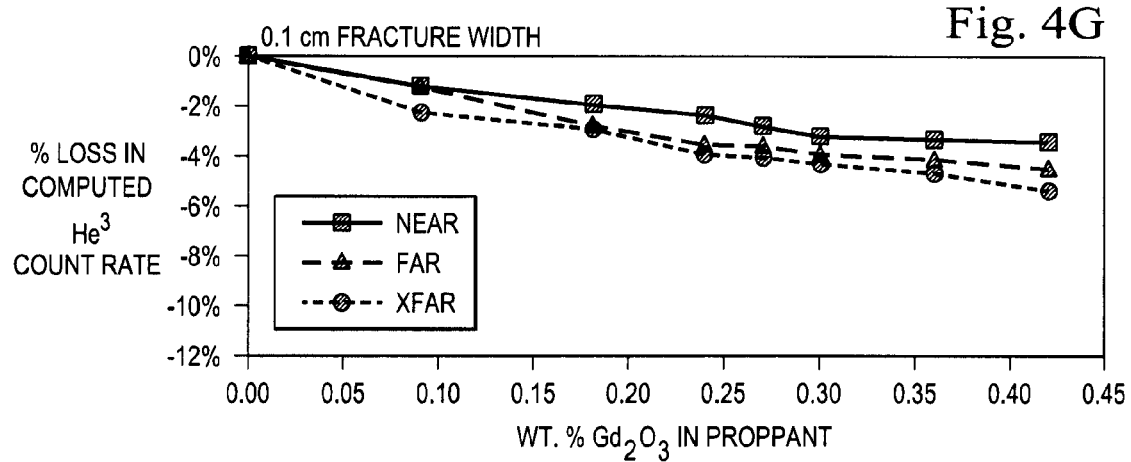
FIGS. 4G-4L are similar to FIGS. 4A-4F, with gadolinium oxide ($Gd_2O_3$) replacing $B_4C$ as the high capture cross section material in the proppant.
Figure 4H:
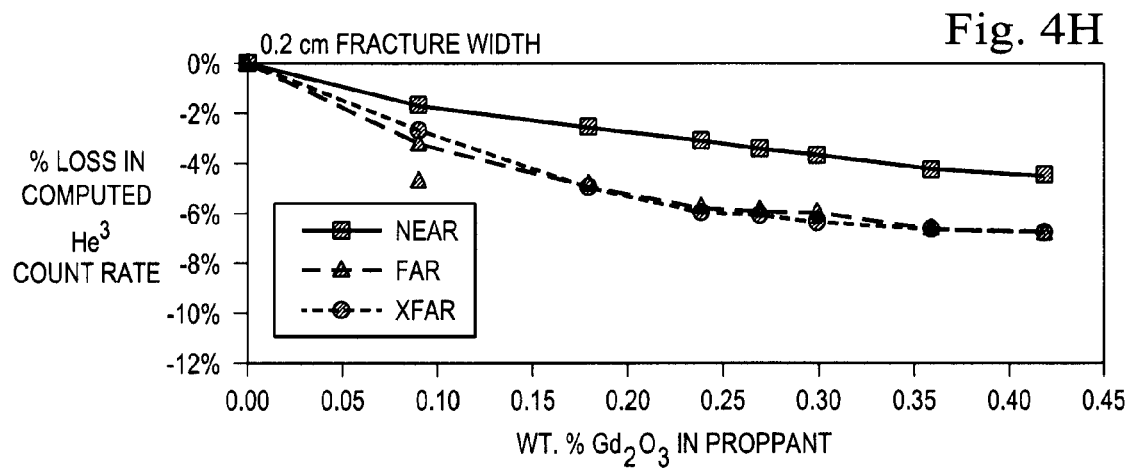
Figure 4I:
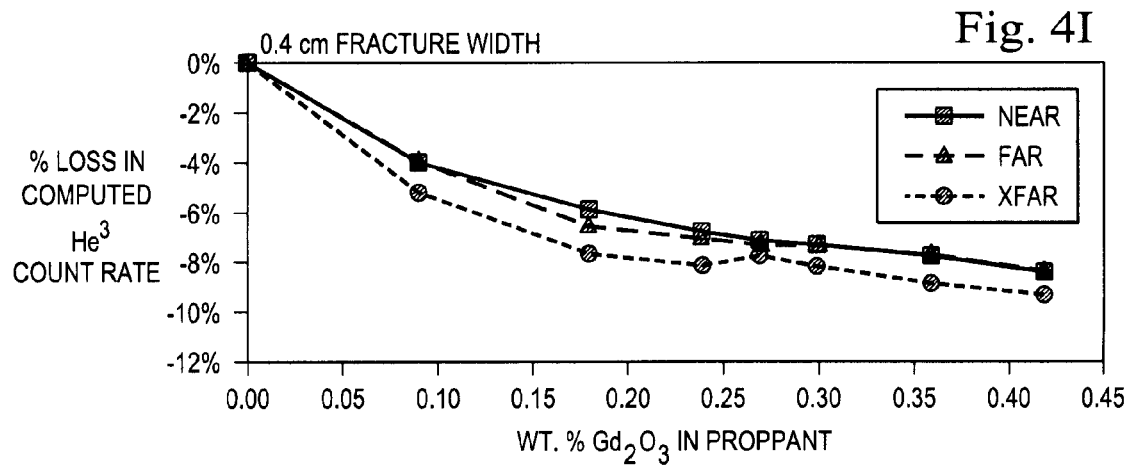
Figure 4J:
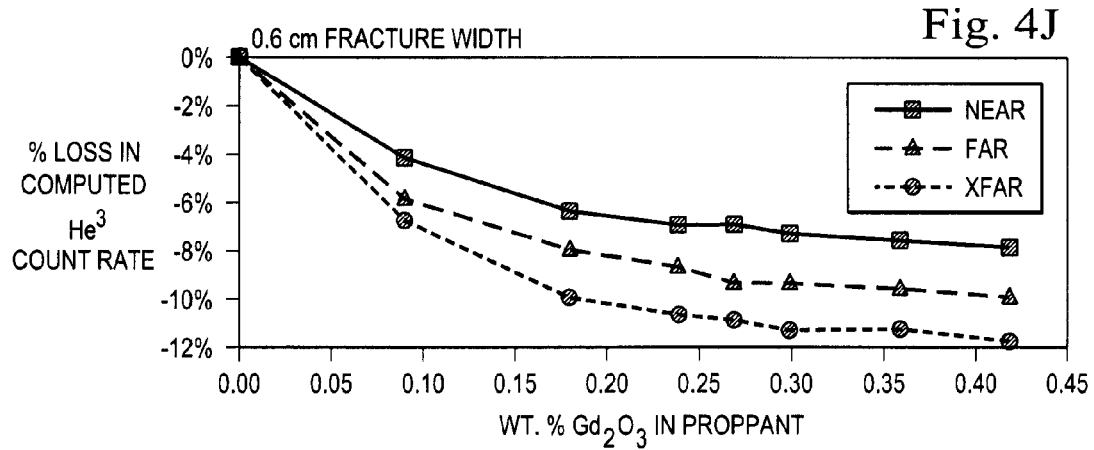
Figure 4K:
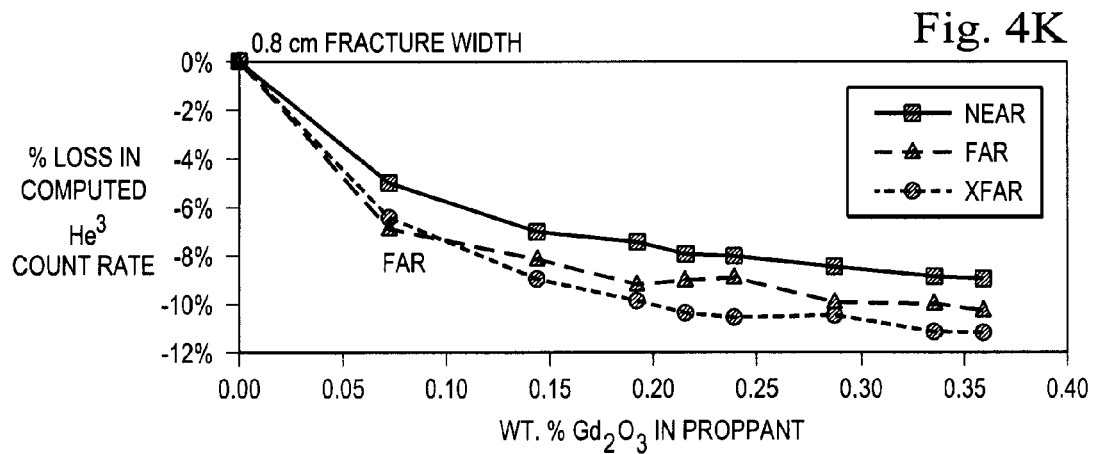
Figure 4L:
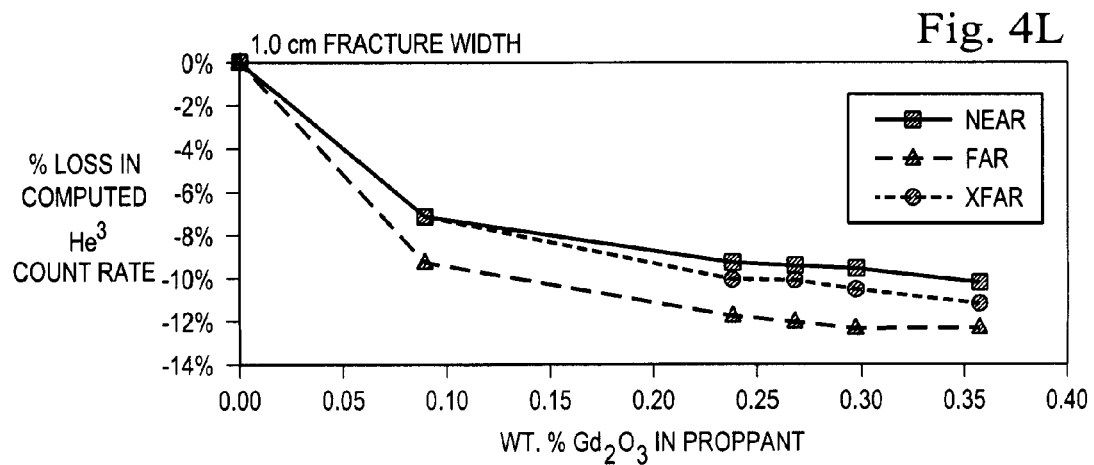

For the purposes of the following examples, FIGS. 3A and 3B present views along the Z-axis of the geometries used in the MCNP5 modeling. In all cases the 8 inch diameter borehole is cased with a 5.5 inch O.D. 24 lb/ft. steel casing and no tubing, and is surrounded by a 1 inch wide cement annulus. The 1.6875 inch diameter tool is shown in the parallel ("para") position in FIG. 3A and in the perpendicular ("perp") position in FIG. 3B. In the "para" position the decentralized logging tool is aligned with the fracture, and in the "perp" position it is positioned 90° around the borehole from the fracture.

In FIGS. 3A and 3B, the formation area outside the cement annulus was modeled as a sandstone with a matrix capture cross-section of 10 capture units (cu). Data was collected for water-saturated formations with several porosities. These two figures show the idealized modeling of the formation and borehole region that was used in most MCNP5 runs. The bi-wing vertical fracture extends radially away from the wellbore casing, and the frac slurry in the fracture channel replaces the cement in the channel as well as the formation in the channel outside the cement annulus. The width of the fracture channel was varied between 0.1 cm and 1.0 cm in the various modeling runs. In one study, the entire cement annulus was replaced by proppant doped with boron carbide. The MCNP5 model does not provide output data in the form of continuous logs, but rather data that permit, in given formations and at fixed positions in the wellbore, comparisons of pre-fracture and post-fracture logging responses.

EXAMPLE 1

Neutron/Compensated Neutron Tool

The MCNP5 software modeled a compensated neutron logging tool with a continuous neutron source and one or more thermal neutron detectors, and the resulting count rate(s) and count rate ratios were recorded for the geometries shown in FIG. 3A or 3B. These observed parameters were then compared to corresponding values recorded in MCNP5 runs made before a well was fractured. Decreases in observed count rates in the post-fracture data relative to the pre-fracture data in FIGS. 4A-4F for various fracture widths and boron carbide concentrations are indicative of the presence of the boron carbide doped proppant, and hence the presence of the induced fractures. In general, since similar percentage decreases in count rates are observed in each of the detectors for a given concentration of boron containing proppant present, the fractional changes in a count-rate ratio will be much less than the changes observed in the individual detector count rates themselves. In FIGS. 4G-4L, modeled with gadolinium oxide replacing boron carbide as the high capture cross section material in the proppant in the same formation and fracture width conditions as FIGS. 4A-4F, very similar decreases are observed in count rates in post-fracture data relative to pre-fracture data relative to those observed with boron carbide present. It is apparent from FIGS. 4A-4L that boron carbide and gadolinium oxide act similarly to reduce the detected count rates, however only about 25-30% of the weight percentage of gadolinium oxide relative to boron carbide in the proppant is required to produce similar count rate decreases.

The formation material and accompanying fractures were modeled to extend out to a radius of 100 cm from the center of the borehole, and vertically from 40 cm below the source to 100 cm above the source. The logging tool contained three $He^3$ thermal neutron detectors spaced away from an Americium-Beryllium (AmBe) neutron source. As shown in Table 1, formation porosity was modeled as 28.3%, 14.15%, 7.1%, and 3.5%.

TABLE 1

Compensated neutron tool data showing the sensitivity of the neutron tool count rates at different detector spacings to the presence of 1% boron carbide in a proppant relative to no frac present (cased and cemented borehole).

| Formation porosity (%) | Tool orientation: para or perp | $B_4C$ in proppant | Near Det. Count rate | % Change from Undoped Proppant | Far Det. Count Rate | % Change from Undoped Proppant | Xfar Det. Count Rate | % Change from Undoped Proppant |
|---|---|---|---|---|---|---|---|---|
| 28.3 | Para | 0% | 8390 | 0% | 772 | 0% | 62.2 | 0% |
| 28.3 | Para | 1% | 7563 | −9.9% | 678 | −12.2% | 54.1 | −13.0% |
| 28.3 | Perp | 0% | 8258 | 0% | 760 | 0% | 60.7 | 0% |
| 28.3 | Perp | 1% | 7974 | −3.4% | 727 | −4.3% | 58.4 | −3.8% |
| 14.15 | Para | 0% | 11632 | 0% | 1511 | 0% | 159.2 | 0% |
| 14.15 | Para | 1% | 10449 | −10.2% | 1300 | −14.0% | 134.1 | −15.8% |
| 7.1 | Para | 0% | 14946 | 0% | 2638 | 0% | 346.1 | 0% |
| 7.1 | Para | 1% | 13491 | −9.7% | 2256 | −14.5% | 286 | −17.4% |

TABLE 1-continued

Compensated neutron tool data showing the sensitivity of the neutron tool count rates at different detector spacings to the presence of 1% boron carbide in a proppant relative to no frac present (cased and cemented borehole).

| Formation porosity (%) | Tool orientation: para or perp | B₄C in proppant | Near Det. Count rate | % Change from Undoped Proppant | Far Det. Count Rate | % Change from Undoped Proppant | Xfar Det. Count Rate | % Change from Undoped Proppant |
|---|---|---|---|---|---|---|---|---|
| 3.5 | Para | 0% | 17792 | 0% | 3970 | 0% | 614.8 | 0% |
| 3.5 | Para | 1% | 16441 | −7.6% | 3418 | −13.9% | 513 | −16.6% |

Table 1 shows modeled thermal neutron count rates in a typical downhole formation geometry for three different source to detector spacings. The percentage change from undoped proppant shown in Table 1, is the percentage count rate reduction from the count rate when boron carbide doped proppant is in the fractures (C1%), relative to the count rate with no B₄C present (C0%) and is calculated as (C1%−00%)/C0%. The modeling data assumes the use of the 1.6875 inch diameter through-tubing neutron tool, and formation and borehole geometry described in FIGS. 3A and 3B. The formation being fractured has a low capture cross-section typical of candidate frac intervals. The borehole casing and cement conditions are also typical (5.5 inch casing filled with non-saline fluid, and a 1 inch thick cement annulus surrounding the casing). The width of the fracture is 1.0 cm. The ceramic proppant in the fracture was modeled to be CARBO ECONOPROP®, which is a low density proppant having an apparent specific gravity of 2.7 and which is commercially available from CARBO Ceramics Inc. having 1.0% (w/w) boron carbide, but is otherwise typical. The formation porosity is assumed to be 28.3%, 14.15%, 7.1%, and 3.5%. In the case of the 28.3% porosity formation, the hydrogen index of the frac fluid plus proppant is the same as that of the formation without a fracture present. As a result, the effect of the boron carbide doped proppant on the count rates can be seen directly, without any influence of a change in hydrogen index of the frac slurry. The boron carbide doped proppant was assumed to be located only in the fracture itself. The computed decrease in count rate when the decentralized tool is aligned with the fracture plane ("para" geometry in FIG. 3A) varies somewhat with source-detector spacing, but in all cases is significant (an approximately 10-13% reduction relative to the situation when no fracture is present). With a larger diameter tool that displaces more of the borehole fluid, the signal would be even larger. Similar results would be obtained if gadolinium oxide is used as the high capture cross section material instead of boron carbide.

Additional data in Table 1 illustrates the effect of similar fracturing in lower (14.15%, 7.1%, and 3.5%) porosity formations, i.e., formations with lower hydrogen content (hydrogen index). In corresponding comparisons when the lower porosity formations were modeled instead of a 28.3% porosity formation, somewhat larger signals were generally observed relative to those in the 28.3% porosity formation. The increased signals in the lower porosity formations are due to the additional neutron attenuating effect produced by the higher hydrogen concentration in the frac fluid relative to that in the low porosity formations. These signals would be even more pronounced if the formation had been modeled to contain gas as well as, or instead of, water (or oil).

Also seen in Table 1 is a smaller, yet still significant, decrease in the observed count rates, when the tool is displaced 90° around the borehole ("perp" geometry in FIG. 3B), in which case the distance of the tool from the fracture is maximized. This reduction in signal due to misalignment of the tool and the fracture would be minimized if a larger diameter tool were used, or if some of the proppant were distributed within the borehole region as well as in the fracture. The count rates in Table 1 resulted in statistical standard deviations of approximately 0.5-1.0% in the computed count rates. This statistical repeatability can be observed in this figure, since in the 28.3% porosity formation, the "para" and "perp" runs with no boron carbide present are effectively repeat runs.

Data was also collected using the same 28.3% porosity formation, borehole, and tool parameters as in Table 1, but with varied fracture widths and differing boron carbide concentrations in the proppant, as shown in FIGS. 4A through 4F. The count rate decreases (signals) are enhanced as the boron carbide concentration in the proppant increases. Also the data indicates that even for fractures as thin as 0.1 to 0.2 cm, a significant signal is observed when the boron carbide concentration in the proppant approaches 1.0%. The data also indicates that the signals at the different source-detector spacings were not greatly different, implying that a short spacing detector, with the resulting higher count rates (and hence smaller statistical errors), would be usable. Also indicated by the very similar responses for fractures wider than ~0.5 cm, is that concentrations of boron carbide in the proppant higher than 1.0% would be of only limited utility. However, if it is anticipated that fracture widths in certain types of formations would tend to be very narrow, the boron carbide concentration in the proppant can be increased to the range of about 1.0% to about 4.0%. There is a measurable count rate reduction in the presence of borated proppant for boron carbide concentrations shown in FIGS. 4A-4F, even as low as about 0.1% boron carbide. FIGS. 4G-4L illustrate exactly the same formation, borehole and fracture conditions as illustrated in FIGS. 4A-4F, however gadolinium oxide was used as the high cross section material instead of boron carbide. As can be seen, only 25-30% as much gadolinium oxide relative to boron carbide is required to produce similar decreases in count rates.

Figure 5A:
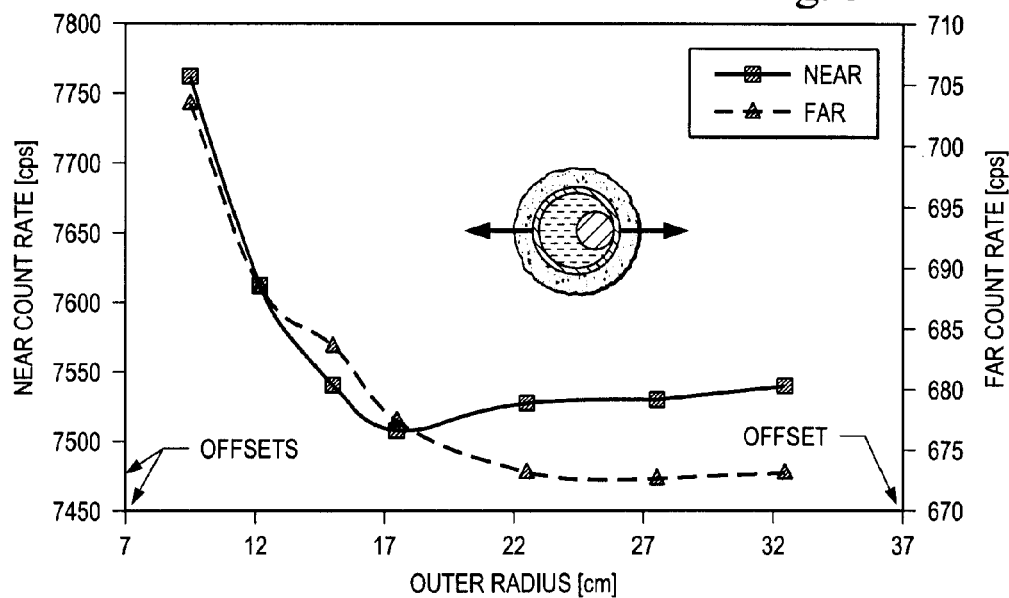
FIGS. 5A and 5B are graphs evaluating the depth of measurement using two detectors at different locations (near and far) on a compensated neutron tool.
Figure 5B:
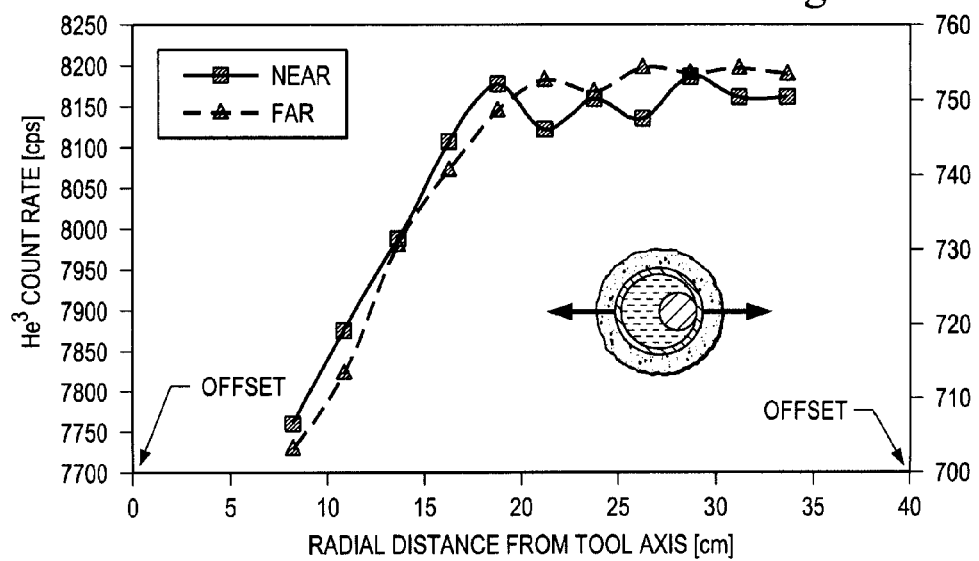

Referring to FIGS. 5A and 5B, data was collected to determine the depth of the investigation of the measurement, in other words, how far back into the formation from the casing could boron carbide doped proppant with 1.0% boron carbide be detected in a 1.0 cm wide fracture. In FIG. 5A, data is modeled for the fracture extending outward from the borehole to progressively deeper depths into the formation. Good fracture sensitivities in the count rates were observed out to about 10 cm from the casing, i.e. 7.5 cm out past the cement annulus. FIG. 5B integrates the contribution from a small incremental volume of fracture material, as this volume element is modeled progressively further from the casing. From the data in both of these figures, it can be seen that the sensitivity of the detected count rates to any proppant greater than 10 cm radially from the casing is greatly reduced.

Since frac material in the borehole region is usually also indicative of a propped fracture adjacent to that interval of the borehole, an annulus in the borehole of propped frac slurry outside the casing (proppant slurry replacing the cement) was modeled. Results with the 1.0% boron carbide proppant in the annulus alone, as well as with the proppant in both the annulus and a 1.0 cm wide fracture in a 28.3% porosity formation, are illustrated in Table 2A. Table 2A also indicates the effect of fractures in the "perp" orientation rather than the "para" orientation relative to the logging tool. Table 2B presents similar data for $Gd_2O_3$ proppant in the annulus alone as well as with proppant in both the annulus and in a 0.4 cm wide fracture. Several different concentrations of $Gd_2O_3$ (0.0%, 0.054%, 0.27%, and 0.45%) are illustrated for the proppant in the annulus. The 0.0% data represents standard (undoped) ceramic proppant. The 0.27% data represents a $Gd_2O_3$ concentration roughly equivalent in effect to the 1% $B_4C$ doped proppant in Table 2A. The 0.054% data in Table 2B illustrates the annulus containing the $Gd_2O_3$ proppant at a reduced concentration (simulating 20% of the untagged proppant in the annulus being replaced by proppant containing 0.27% $Gd_2O_3$). The data with 0.45% $Gd_2O_3$ indicates the effect of further increasing the concentration of $Gd_2O_3$ in the proppant.

As shown in Table 2A, the count rate decreases (signals) are now much larger (approximately 30-35% reduction in count rate) due to the 1% $B_4C$ proppant in the annulus relative to undoped proppant in the annulus. However, when 1% $B_4C$ doped proppant is present in the annular region, the effect of additional proppant in the fracture itself is essentially masked. This can be seen from the Table 2A data in that, with doped proppant in the annulus, there are only very small differences in the observed count rates whether or not doped proppant was also present in the fracture. This is true regardless of the orientation—"para" or "perp"—of the fracture relative to the logging tool. It can also be seen in Table 2A that undoped proppant in the annulus results in a somewhat (-5%) higher count rates than plain cement in the annulus, due to the lower hydrogen index of the modeled proppant slurry relative to cement. In any event, since the proppant in the borehole region is usually also indicative of the presence of formation fracturing adjacent to that interval of the borehole, the fracture signal is easily observable, and can be larger than the signal caused by proppant in the fracture alone. Of course it would be unlikely for the entire borehole annulus to be filled with proppant, but modeling data with only 0.2% $B_4C$ in the annulus, representing a 20% proppant fill of the annulus, similarly indicated significant decreases in observed count rates (see analogous 20% proppant fill data presented in Table 2B below).

TABLE 2A

Neutron count rate sensitivity to borated proppant in the borehole annular (cement) region as well as in a fractured formation.
Formation with Fracture and/or Annulus Containing 1% $B_4C$ Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 1.0 cm wide fracture - para orientation | Proppant - undoped | Proppant - undoped | 8984.5 | 0 | 845.05 | 0 | 68.507 | 0 |
| ø = 28.3% with 1.0 cm wide fracture - para orientation | Proppant + 1% $B_4C$ | Proppant - undoped | 6184.8 | -31.2% | 553.96 | -34.4% | 44.862 | -34.5% |
| ø = 28.3% with 1.0 cm wide fracture - para orientation | Proppant + 1% $B_4C$ | Proppant + 1% $B_4C$ | 6135.6 | -31.7% | 547.95 | -35.2% | 44.474 | -35.1% |
| ø = 28.3% with 1.0 cm wide fracture - perp orientation | Proppant - undoped | Proppant - undoped | 8984.5 | 0 | 845.05 | 0 | 68.507 | 0 |
| ø = 28.3% with 1.0 cm wide fracture - perp orientation | Proppant + 1% $B_4C$ | Proppant - undoped | 6172.5 | -31.3% | 554.25 | -34.4% | 44.89 | -34.5% |
| ø = 28.3% with 1.0 cm wide fracture - perp orientation | Proppant + 1% $B_4C$ | Proppant + 1% $B_4C$ | 6154.5 | -31.5% | 549.42 | -35.0% | 44.769 | -34.7% |
| ø = 28.3% with 1.0 cm wide fracture - para orientation | Plain Cement | Proppant- undoped | 8398.7 | | 772.1 | | 62.16 | |

TABLE 2B

Neutron count rate sensitivity to $Gd_2O_3$ proppant in the borehole annular (cement) region as well as in a fractured formation.
Formation with Fracture and/or Annulus Containing $Gd_2O_3$ Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 0.4 cm wide fracture | Proppant - undoped | Proppant - undoped | 8984.5 | 0 | 845.05 | 0 | 68.507 | 0 |
| ø = 28.3% with 0.4 cm wide fracture | Proppant + 0.27% $Gd_2O_3$ | Proppant - undoped | 6732.1 | -25.1% | 599.39 | -29.1% | 47.591 | -30.5% |

TABLE 2B-continued

Neutron count rate sensitivity to $Gd_2O_3$ proppant in the borehole
annular (cement) region as well as in a fractured formation.
Formation with Fracture and/or Annulus Containing $Gd_2O_3$ Proppant

| Formation | Annular region | Fracture | Near Count Rate | % Change from Undoped Proppant | Far Count Rate | % Change from Undoped Proppant | Xfar Count Rate | % Change from Undoped Proppant |
|---|---|---|---|---|---|---|---|---|
| ø = 28.3% with 0.4 cm wide fracture | Proppant + 0.054% $Gd_2O_3$ | Proppant - undoped | 7434.9 | −17.2% | 674.7 | −20.2% | 54.656 | −20.2% |
| ø = 28.3% with 0.4 cm wide fracture | Proppant + 0.27% $Gd_2O_3$ | Proppant + 0.27% $Gd_2O_3$ | 6708.6 | −25.3% | 591.03 | −30.1% | 47.889 | −30.1% |
| ø = 28.3% with 0.4 cm wide fracture | Proppant + 0.054% $Gd_2O_3$ | Proppant + 0.27% $Gd_2O_3$ | 7244.7 | −19.4% | 653.36 | −22.7% | 53.182 | −22.4% |
| ø = 28.3% with 0.4 cm wide fracture | Proppant + 0.45% $Gd_2O_3$ | Proppant + 0.45% $Gd_2O_3$ | 6555.5 | −27.0% | 579.8 | −31.4% | 46.842 | −31.6% |

Table 2B, with 0.27% gadolinium oxide replacing the 1% boron carbide in the proppant, indicates that approximately 25-30% decreases in count rate are observed with $Gd_2O_3$ tagged proppant relative to untagged proppant in the annulus. This is roughly the same effect as observed in Table 2A with 1% $B_4C$ in the annulus. The data in Table 2B also illustrates the significance of a lower percentage (20%) fill of the annulus with the tagged proppant, where the concentration of $Gd_2O_3$ was reduced by a factor of five to 0.054%. It can be seen that even with only a 20% fill of the annulus with tagged proppant and the remainder with untagged proppant (or cement), the observed count rate drops significantly (about 15-20%), which is about three times as large as the decrease with 0.27% $Gd_2O_3$ proppant filling a 0.4 cm fracture (see FIG. 4I). In Table 2B, as in the data in Table 2A, the effect of tagged proppant in the fracture is mostly masked when tagged proppant is also present in the borehole annulus. It can also be seen from the data with the highest (0.45%) $Gd_2O_3$ concentration, that increasing the $Gd_2O_3$ concentration above 0.27% has only a small incremental effect on the count rate decreases (similar to the results seen in FIGS. 4A-4L). From Tables 2A and 2B, it can be seen that similar results are obtained regardless of whether $B_4C$ or $Gd_2O_3$ is used to tag the proppant.

The data in Table 3 illustrates the sensitivity of the neutron count rates to a change in the borehole fluid salinity (BFS), from the non-saline fluids described in the above figures to fluids with salinities up to 250 Kppm NaCl (the salinity of saturated salt water).

TABLE 3

The sensitivity of neutron count rate to borehole fluid salinity (BFS).

| % of $B_4C$ in Proppant in 1.0 cm Fracture in Formation | Borehole Fluid Salinity [Kppm NaCl] | NEAR [cps] | FAR [cps] | XFAR [cps] |
|---|---|---|---|---|
| 1% $B_4C$ | 0 | 7563.30 | 678.00 | 54.18 |
| " | 50 | 6487.90 | 580.95 | 47.25 |
| " | 100 | 5829.10 | 514.43 | 41.83 |
| " | 150 | 5317.90 | 468.58 | 38.32 |
| " | 200 | 4879.90 | 437.07 | 35.55 |
| " | 250 | 4607.90 | 409.82 | 33.33 |
| 0% $B_4C$ | 0 | 8389.70 | 772.11 | 62.16 |
| " | 50 | 7246.60 | 671.63 | 54.34 |
| " | 100 | 6508.10 | 597.32 | 48.66 |
| " | 150 | 5990.70 | 547.81 | 44.94 |
| " | 200 | 5595.10 | 508.74 | 40.96 |
| " | 250 | 5260.60 | 479.68 | 39.42 |

TABLE 3-continued

The sensitivity of neutron count rate to borehole fluid salinity (BFS).

| % count rate difference: (1% $B_4C$ − 0% $B_4C$)/ (0% $B_4C$) at each BFS | Borehole Fluid Salinity (BFS) | % diff. | % diff. | % diff. |
|---|---|---|---|---|
| | 0 | −9.9% | −12.2% | −12.8% |
| | 50 | −10.5% | −13.5% | −13.1% |
| | 100 | −10.4% | −13.9% | −14.0% |
| | 150 | −11.2% | −14.5% | −14.7% |
| | 200 | −12.8% | −14.1% | −13.2% |
| | 250 | −12.4% | −14.6% | −15.4% |

As shown in Table 3, the borehole fluid salinity causes a large suppression in Near, Far, and Xfar count rates. For high borehole fluid salinities, the count rate decreases are much larger than the count rate decreases caused by the presence of boron carbide in the proppant in the fracture. For instance, in a formation with 1% $B_4C$ doped proppant in the fracture, if the borehole fluid salinity were to change from 0 Kppm to 150 Kppm, the count rate in the near detector will decrease by 29.7% ((5317.9−7563.3)/7563.3). This decrease is about 2-3 times larger than the approximately 10-15% decreases in count rate in Table 1 caused by changing the concentration of boron carbide in the proppant in the fracture. The borehole fluid salinity related count rate decreases are also similar to or larger in magnitude relative to the frac signal with tagged proppant in the borehole annular region as shown in Tables 2A and 2B. Also, as shown in Table 3, regardless of borehole salinity, as long as the salinity does not change between the pre-fracture and post-fracture logs, the presence of boron carbide in the proppant in the fracture can easily be detected (10-15% reduction in count rate).

If borehole materials change between the pre-fracture and post-fracture log runs (such as a borehole salinity change as illustrated in Table 3), or if different thermal neutron tools or PNC tools are utilized for the two log runs (for example, compensated neutron tools run by different service companies in the pre-fracture and post-fracture logs), or if the neutron output of the sources used in the pre-fracture and post-fracture logs is different, it will likely be necessary to normalize the log responses, preferably in logged intervals or zones known to be outside of the interval where induced fracturing is possible. It may also be possible in many situations to eliminate the pre-fracture log entirely if a prior neutron log, pulsed neutron log, or compensated neutron log has already been run in the well. That log, possibly also normalized to the post-fracture log as described above, could be substituted for the pre-fracture log.

For example and not limitation, referring back to Table 3, if large changes in fluid salinity were to take place between log runs collected before versus after the frac job, the resulting count rate change would likely be difficult to interpret without the use of normalization techniques. However, since this approximate salinity-based count suppression will be observed up and down the borehole as well as in the fracture interval, it is possible to normalize the count rates from the pre-fracture and post-fracture log runs outside the frac interval of interest, and preferably with the normalization utilizing zones with similar porosity to the formation(s) being fractured. A similar normalization procedure might be required if different tools or neutron sources are used for pre-fracture and post-fracture log runs, or if a pre-existing or synthesized neutron, compensated neutron, or PNC log is used to substitute for the pre-fracture log.

It should be pointed out that when using the above described methods involving count rate changes between the pre-frac and post-frac count rate logs to indicate the presence of tagged proppant (and hence induced fractures), in some instances where it is anticipated that gas saturation (hydrogen index) changes may also occur between the pre-frac and post-frac logs, it might be advantageous to emphasize data in the near detector for making the comparisons. Percentage changes in count rate in the near detector due to changes in hydrogen index are significantly smaller than in longer spaced detectors (see Table 1), however the percentage change in count rate in each of the detectors due to the presence of doped proppant is more or less independent of detector (see FIGS. 4A-4L). Hence use of the near detector (as opposed to the longer spaced detectors) would effectively emphasize proppant related count rate changes relative to hydrogen index related count rate changes.

The data shown in Table 4 demonstrates the limited sensitivity of compensated neutron near/far detector count rate ratios to the presence of the boron carbide doped proppant relative to the sensitivity of the ratio to changes in formation porosity. The near/far detector count ratios (N/F) with and without boron carbide doped proppant are shown for various formation and borehole situations. There appear to be only small ratio increases with the proppant present. From this data, and the count rate data in Tables 1 and 2A, FIGS. 4A-4F, and FIGS. 5A-5B it can be seen that a dual spaced thermal neutron ratio is influenced significantly less by the presence of boron carbide doped proppant than the individual count rates themselves. Similar ratio insensitivity was observed with $Gd_2O_3$ replacing $B_4C$ in the proppant.

In all of the data in Table 4, the proppant contains 1% boron carbide, and the fractures are 1 cm wide, and the geometry is the "para" position shown in FIG. 3A. On all runs, the one standard deviation statistical uncertainty in each ratio is +/−2% (or less) of the ratio value. Since compensated neutron tools use a ratio to determine formation porosity, it is possible to use the count rate decreases observed in the post-fracture logs to indicate fractures, while simultaneously using the post-fracture count rate ratio data to indicate formation porosity, virtually independent of the presence of the proppant and fracture.

Figure 8:
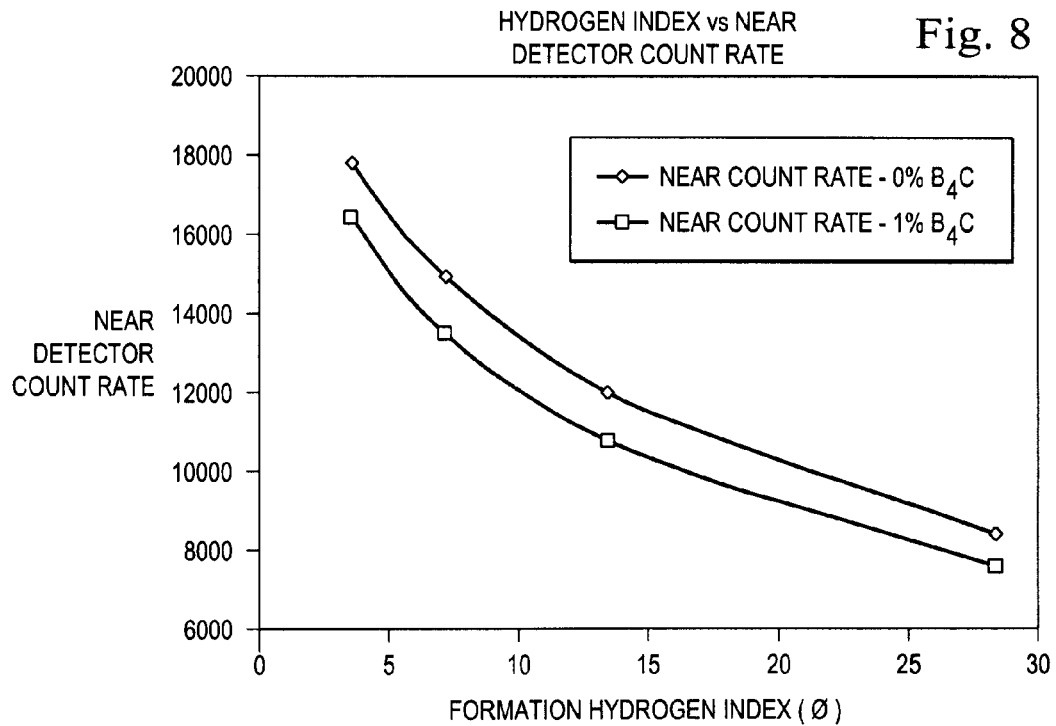
FIG. 8 is a plot of the functional relationship between the thermal neutron count rate measured in one detector in a compensated neutron tool as a function of the hydrogen index of downhole formations with no fracture present, assuming the borehole fluid and borehole conditions illustrated in FIG. 3A. Also shown is the functional relationship between the same parameters with 1% $B_4C$ tagged proppant in a 1.0 cm wide induced fracture in the formation.
Figure 9:
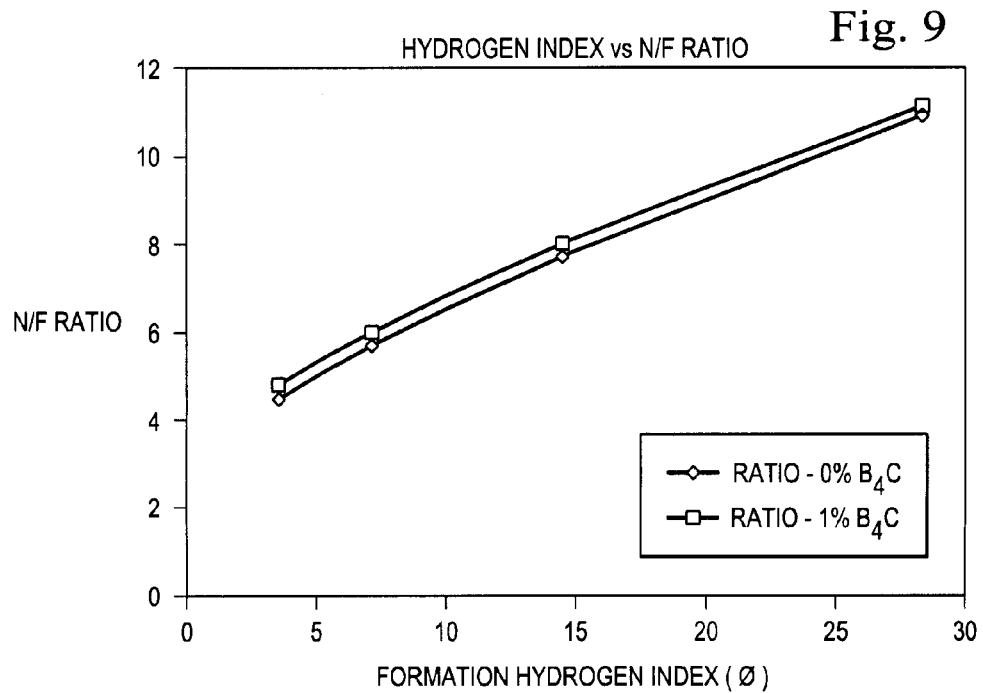
FIG. 9 is a plot of the functional relationship between the ratio of thermal neutron count rates measured in two different spaced detectors in a compensated neutron tool as a function of the hydrogen index of downhole formations with no fracture present, assuming the borehole fluid and borehole conditions illustrated in FIG. 3A. Also shown is the functional relationship between the same parameters with 1% $B_4C$ tagged proppant in a 1.0 cm wide induced fracture in the formation.
Figure 10:
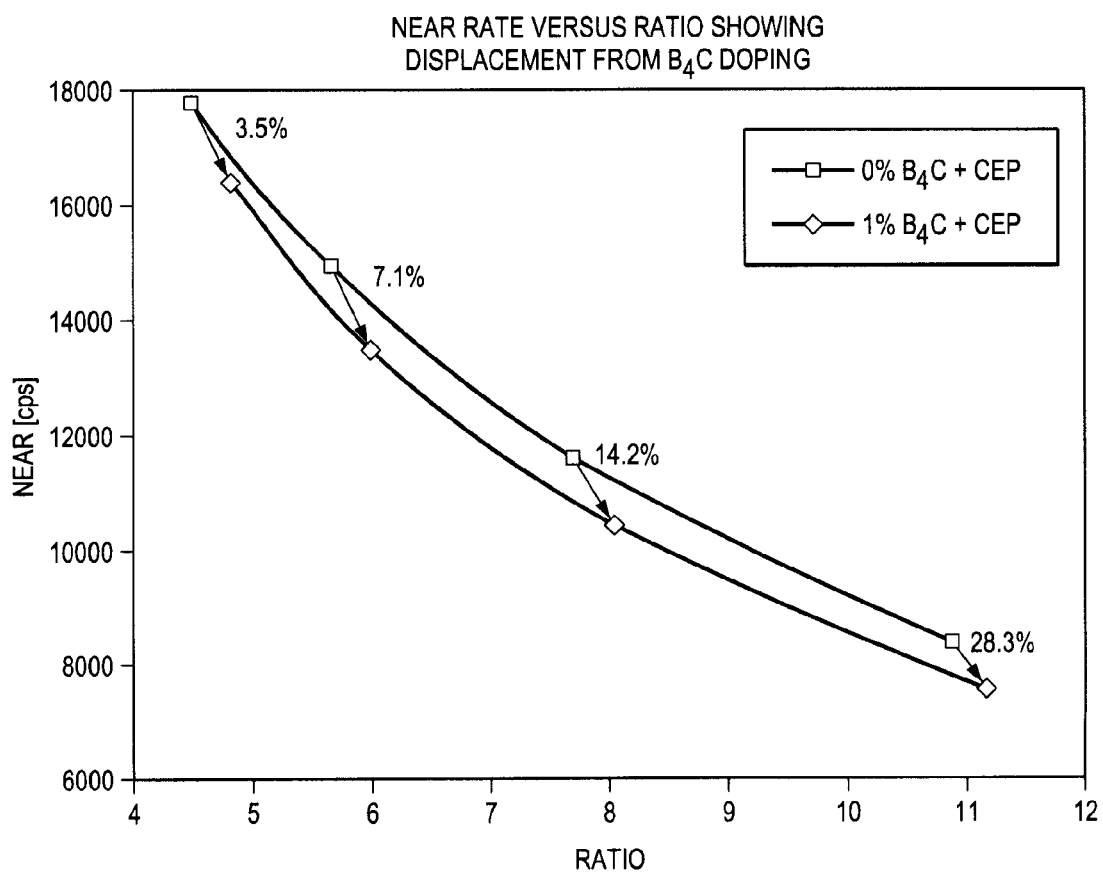
FIG. 10 is a table of the NEAR thermal neutron count rate versus the RATIO of the NEAR thermal neutron count rate to the FAR thermal neutron rate at 0% and 1% boron carbide ($B_4C$) concentration in proppant (CEP). This figure also depicts the displacement in both count rates and ratio values as $B_4C$ concentration increases from 0% to 1% across the range of formation porosities (hydrogen indices) displayed in this figure.

Other valuable information regarding fracture identification can also be observed from the data in Table 4 and Table 1, and in FIGS. 8, 9, and 10, all of which were derived from data in Table 1. The detector count rate changes in Table 1 were caused hydrogen index changes resulting from changing the formation porosity, however similar changes in count rates will result from changing the hydrogen index in a given formation via a change in gas saturation in the pore space and/or fracture. Should the hydrogen index of the formation change between the pre-fracture and post-fracture logs due to a change in the gas saturation in the formation/fracture, changes in the count rates in all of the detectors will be observed. These count rate changes due to hydrogen index changes might make it difficult to isolate, identify and/or quantify count rate changes caused by the presence of the of the doped proppant in the fracture and/or borehole region. However, from Table 4 it can be seen that the neutron count rate ratio is sensitive to hydrogen index changes in the formation, but is virtually independent of the presence of the proppant.

FIGS. 8 and 9 present a portion of this tabular information in graphical form. In FIG. 8, the relationship between the formation hydrogen index and the count rate in the near detector is illustrated. The upper curve illustrates the relationship with no fracture present. The lower curve is the relationship between the formation hydrogen index and the near count rate with 1% B4C in a 1.0 cm. wide induced fracture in the formation. From FIG. 8 it can be seen that across a wide range in formation porosities, the observed count rates with tagged proppant present are significantly lower than in the same formations with no proppant present. If the upper curve were used as illustrative of a predetermined calibrated relationship between hydrogen index and count rate, then with tagged proppant present, the lower count rates observed would translate into higher computed apparent hydrogen index values (2-5 porosity units higher). In FIG. 9, similar data is plotted for the relationships between the formation hydrogen index and a dual-spaced (near/far) count rate ratio. Note that in FIG. 9, there is virtually no difference between this relationship without proppant present versus the relationship with tagged proppant in a fracture. Therefore if the slightly lower curve (with no fracture present) were used to define a predetermined relationship between hydrogen index and ratio, then the apparent hydrogen index computed with tagged proppant present would differ only slightly (less than 1 porosity unit) from that obtained with no proppant present.

One way to qualitatively interpret observed count rate changes between the pre-frac and post-frac logs would be to combine the ratio data with the count rate data. If little or no change in ratio was observed between the pre-frac and post-frac logs, one could confidently assume that any observed count rate changes were due to the proppant. If both the ratio and the count rate change significantly between the logs (or if the ratio changes significantly and the count rate doesn't change significantly), then further discrimination is required to determine how much of the changes were due to the proppant versus a change in formation hydrogen index. One way to do this would be to utilize method 2 described below.

This second method combines count rate ratios and detector count rates to locate intervals containing tagged proppant. One embodiment of this second method involves the use of a ratio vs. count rate crossplot, as illustrated in FIG. 10. FIG. 10 (using data from Table 1) visualizes the effect of boron carbide ($B_4C$) concentration in a proppant on measured near detector thermal neutron count rate, crossplotted versus the near/far detector count rate ratio. As described earlier, since both near count rate and ratio are sensitive to formation hydrogen index (porosity), a crossplot of these variables across logged intervals containing no tagged proppant will result in a well defined trend/trendline on the crossplot. Since near count rate is also very sensitive to tagged proppant, but the near/far ratio is not (as previously shown in FIGS. 8 and 9), points on the crossplot representing intervals containing proppant will fall off of this proppant-free trend/trendline.

The upper curve in FIG. 10 is the proppant-free trendline for the data from Table 1, with the four points along this trendline representing four formations with different hydrogen index (porosity) values. This trendline may be even better defined in a field log if environmental corrections have been separately applied to both the near count rate and to the ratio to correct for borehole diameter, tool standoff, borehole salinity, etc. This upper curve forms the trendline/trajectory along which points "move" as formation hydrogen index changes. If points fall off this trendline (in the SSE direction), then the presence of tagged proppant (in this case $B_4C$) is indicated. The lower curve shown in FIG. 10 represents a second trendline/trajectory for intervals of varying hydrogen index containing tagged proppant. The four data points on the lower curve represent formations having the same HI values as the corresponding points on the upper trendline; however all of these lower points represent the formations with fractures containing ceramic CEP proppant tagged with 1% $B_4C$). In the same four formations, as proppant concentration increases from 0% to 1%, the arrows on the plot indicate the progressive "movement" the crossplotted points would take. A similar effect would be observed as the width of a proppant-containing fracture increases. This type of crossplot data may form the basis of software algorithms used in real-time and/or post-processing to identify these intervals containing the proppant tagged with $B_4C$ (or $Gd_2O_3$, or some other thermal neutron absorber).

This type of ratio-count rate crossplot can be of use whether or not a pre-frac log is available. If a pre-frac log is available, as long as borehole fluid and borehole conditions do not change across the logged interval (or if environmental corrections have been applied to the data), all the data should form a trend/trendline, such as the upper curve in FIG. 10. In a corresponding post-frac log crossplot, the same trend/trendline should be observed in intervals which do not contain tagged proppant. If that is not the case, the implication is that borehole fluid and conditions have changed between the pre-frac log and the post-frac log (since count rate is more sensitive to borehole changes than the ratio), and that information can be used to determine whether count rate normalization processes are necessary prior to using the earlier-described pre-frac vs. post-frac count rate overlay method to identify proppant containing intervals. If a pre-frac log is not available, then the post-frac log can be processed without the use of pre-frac data by utilizing the crossplot method described above in relation to FIG. 10.

Yet another preferred embodiment of the second method for combining the near/far (N/F) ratio and a detector count rate from a post-frac log to locate tagged proppant can also be deduced from the data in FIGS. 8-10 and Tables 1 and 4. This embodiment utilizes a comparison, for each depth in the well, of a detector count rate determined from the N/F ratio compared with the count rate as actually observed in either the near or far detector. The count rates in both detectors and the N/F ratio are uniquely related to the formation hydrogen index in intervals that do not contain tagged proppant, as seen in the upper curve in FIG. 10. Therefore, it is possible to develop, for a given borehole fluid and set of borehole conditions, a direct functional relationship in a non-proppant-containing interval of the well between observed near detector count rate and the N/F ratio (and a corresponding relationship can be developed between the observed far detector count rate and the N/F ratio). This relationship can be developed from regressions based on count rate vs. ratio cross-plots, as seen in FIG. 10, or using other mathematical techniques well known in the art. This relationship can then be used to predict detector count rates from observed N/F ratios across the entire logged interval of the well which has the same or similar borehole fluid and borehole conditions as the interval(s) used to develop the count rate vs. ratio relationship. This entire logged interval can include the intervals where tagged proppant may be present. The count rate predicted from the ratio varies with differences in formation hydrogen index in formations up and down the wellbore, but is unaffected by high capture cross-section material in proppant, since the ratio itself is unaffected by the presence of the proppant (see Table 4). The actual measured count rates observed in each detector will be similarly affected by differences in formation hydrogen index, but will also be affected by the presence of tagged proppant (the observed/measured count rate will be suppressed in intervals containing proppant, as discussed earlier, and as seen in FIG. 8). By comparing, via cross-plots or log overlays, the ratio derived count rate with the actual observed count rate, intervals containing tagged proppant can be identified.

Since the N/F ratio is less sensitive to changes in borehole fluid and borehole conditions than the detector count rates, it may be desirable to develop the relationship between the detector count rate and ratio, as discussed in the paragraph above, in an interval of the well with the same borehole fluid and borehole conditions as are present in the intervals of the well where it is desired to determine if tagged proppant is present. If multiple borehole fluids and/or borehole conditions are present in different intervals up and down the borehole (such as one interval with gas in the borehole and a deeper interval with liquid in the borehole), it may be desirable to "zone" the well such that each interval of the well with different borehole fluid and/or borehole conditions is treated individually. Locating changes in borehole fluid or borehole conditions in the well (for zoning purposes) on the post-frac log can be accomplished by using ratio vs. count rate cross-plots, by comparing count rates on the post-frac log with corresponding count rates on any open hole or pre-frac neutron logs (if available), or by using field or well completion information. Within intervals of the well where the borehole fluid is unchanging, it may still be desirable to use an open hole log (e.g. caliper log or density log delta rho curve), a cement bond log, or field/well information to ensure that the sub-interval(s) where the relationship between the count rate and ratio is developed has similar borehole conditions (e.g. hole size, casing weight, cement conditions, etc.) as the sub-interval(s) of the well where it is desired to know whether or not tagged proppant is present.

Locating different zones (intervals with similar borehole and/or formation properties) within the entire logged interval in a well, and also the determination of the relationships between observed count rates and N/F ratios using cross-plots and regression are processes that are very sensitive to depth alignment and materially matched filtering of the near and far count rates prior to computing their ratio and constructing the relevant cross-plots. Materially matched filters are designed such that both the near and far count rates respond to the same vertical extent of formation and typically involves filtering the near more than the far. These cross-plots are also sensitive to well conditions as a function of depth since intervals with differing borehole conditions and borehole fluid content (oil, saltwater, gas) will alter the cross-plots. After a careful review of near, far, and ratio logs over the complete logging interval, as well as analyses of the casing and drilling records and other well information, ratio vs. observed near or far count-rate cross-plots (and possibly near vs. far observed count-rate cross-plots) are formed for determining the number of sub-intervals, or zones, within the entire depth interval. Care must be taken to not include the actual fracturing intervals of interest. Each individual zone is evident from these plots when the plotted points within the zone fall along a smooth curve whose scatter reflects only statistical precision (repeatability). Multiple zones in a well can be identified by multiple different smooth curves on cross-plots. The process of sub-dividing these cross-plots into finer and finer zones is terminated when all the cross-plots of near and far count rates versus ratios involve smooth curves only. Once all the different zones in the logged interval are identified, the relationship between an observed count rate and the N/F ratio in each zone is computed (being careful to exclude sub-intervals where perforations and tagged proppant may be present), and that relationship is used to predict count rates from the ratio in all intervals in the well with the same zonal properties, including any intervals where it is desired to know if tagged proppant is present.

Another factor which may need to be considered in selecting the interval of the well where the relationship between detector count rate and N/F ratio is developed is formation rock type/lithology (e.g. sand vs. limestone vs. dolomite). This relationship may be slightly different in formations of different rock types; therefore it may be desirable to select the sub-interval where the count rate-ratio relationship is developed to have the same lithology as the intervals in which it is desired to know whether proppant is present. A determination of formation lithology can be determined from field information, from data obtained from open hole logs (such as Pe curves on density logs or neutron-density crossplots), from other cased hole logs on the well (such as spectral data from pulsed neutron logs), or various combinations of prior well data.

Yet another factor which may need to be considered in selecting the interval(s) of the well where the relationship between detector count rate and N/F ratio is developed is formation gas saturation. Due to the well-known excavation effect, there is a slight difference in the response of neutron logs to gas bearing vs. low porosity formations. Therefore, to the degree possible, it may be desirable to select the sub-interval where the count rate-ratio relationship is developed to have formations with the same gas saturations as the intervals in which it is desired to know whether proppant is present. Gas saturation information can be determined from field information, from information obtained by combining selected open hole logs (such as separation on neutron-density log overlays), from other cased hole logs on the well, or by using various combinations of prior well data.

TABLE 4

Near/Far detector count ratios of a compensated neutron tool in the presence of boron carbide doped proppant.

| | Near/Far Detector Count Ratios |
|---|---|
| Base case: fresh water in borehole, 28.3% porosity formation | (a) No fracture present, N/F = 10.9<br>(b) Propped fracture present, N/F = 11.1<br>(c) Proppant in cement annulus but not fracture, N/F = 11.2<br>(d) Proppant in cement annulus and fracture, N/F = 11.2 |
| Base case: salt water (250 Kppm NaCl) in borehole, 28.3% porosity formation | (a) No fracture present, N/F = 11.0<br>(b) Propped fracture present, N/F = 11.2 |
| Base case: fresh water, 14.15% porosity formation | (a) No fracture present, N/F = 7.7<br>(b) Propped fracture present, N/F = 8.0 |
| Base case: fresh water, 7.1% porosity formation | (a) No fracture present, N/F = 5.67<br>(b) Propped fracture present, N/F = 5.98 |
| Base case: fresh water, 3.5% porosity formation | (a) No fracture present, N/F = 4.48<br>(b) Propped fracture present, N/F = 4.81 |

FIG. 7A is an exemplary neutron/compensated neutron well log comparison between pre-fracture and post-fracture data sets. The proppant used in the frac was tagged with a high thermal neutron capture cross section material. The locations and heights of the fractured intervals are determined by correlating the intervals having differences in the pre-fracture and post-fracture count rate data to the corresponding depth intervals in the well.

The observed count rates in all three detectors (near, far, and x-far) are reduced in the post-fracture logs in intervals of fracturing, regardless of whether proppant is in the borehole or in the fracture or in both. The absolute count rates are lower in the detectors farther from the source, and the fractional signals (separation between curves) may be slightly greater in the longer spaced detectors. The pre-fracture and post-fracture log normalization intervals above and/or below the potential frac interval are used to normalize the pre-fracture and post-fracture logs in the situations where log normalization is required.

Figure 11A:
FIGS. 11A and 11B, respectively, are downwardly successive sections of a log example from an experimental field test illustrating the utility of one of the embodiments herein below described to locate proppant incorporating a high thermal neutron capture cross-section material in induced formation fractures.
Figure 11B:
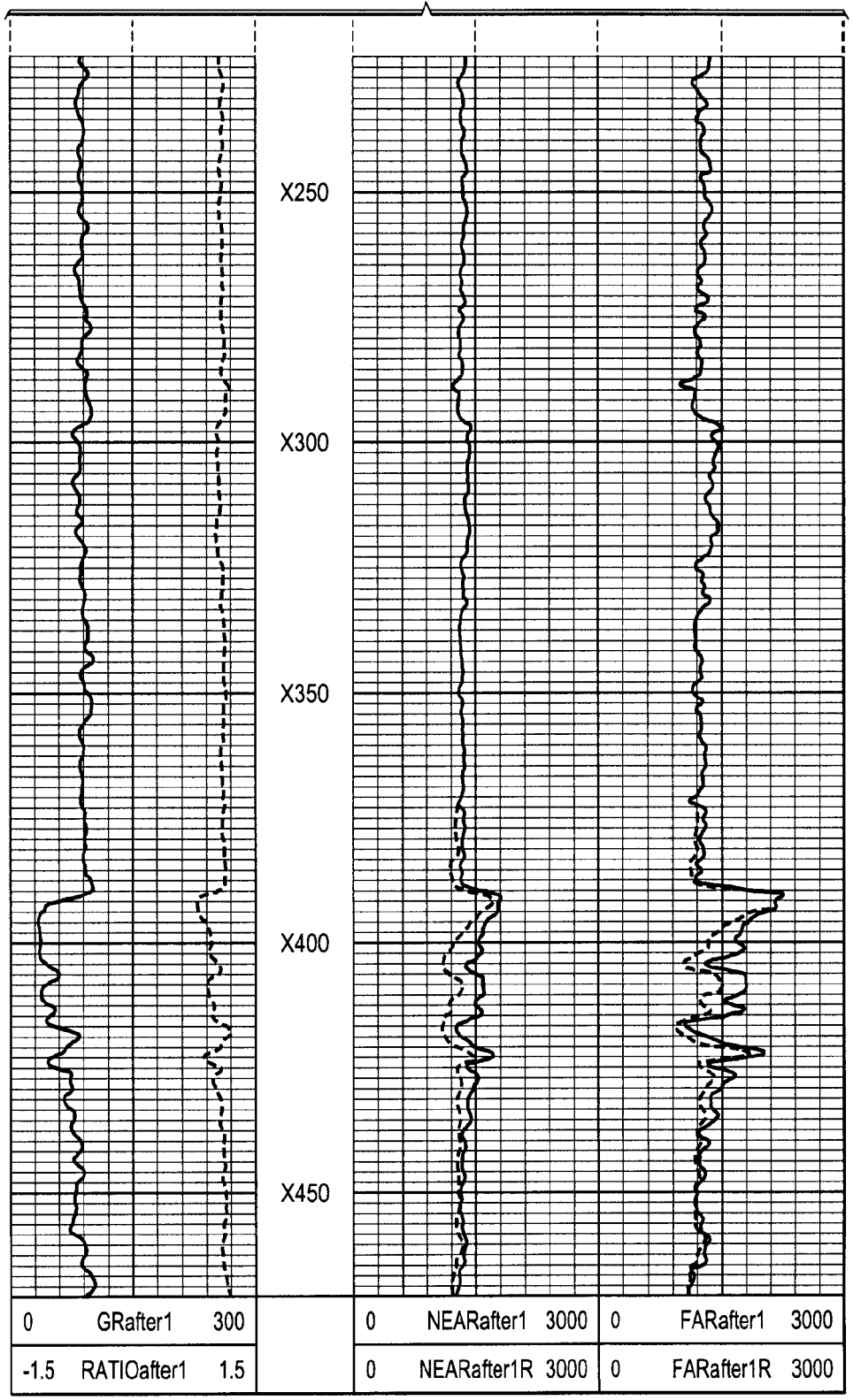

FIGS. 11A and 11B, respectively, are downwardly successive sections of an example from an experimental field test demonstrating how log processing involving only an after-frac log can be used to identify intervals containing tagged proppant. The illustrated interval was logged at ~30 ft/min. with a commercial compensated neutron tool between X000 ft and the bottom of the well at X470 ft, where the "X" in each listed depth replaces the actual leading digit(s) in order to protect confidential well information. This entire interval was known to have the same borehole size (from open hole caliper logs), the same borehole fluid (there was a gas/liquid fluid level in the borehole 26 ft. above the top of the interval illustrated in FIG. 11A), and the same formation lithologies (from open hole logs). The entire illustrated well interval contained a cemented 4.5" OD 13.5 lb/ft. casing. The well was perforated and fractured using gadolinium oxide (0.4 weight %) tagged ceramic proppant in two intervals between X392 and X416 ft. A relationship between N/F ratio (designated as "RATIOafter1" in FIGS. 11A and 11B) and near detector count rate (designated as "NEARafter1" in FIGS. 11A and 11B) was developed using the X000-X350 ft interval. The "after" in the designations indicate that the log was run after the frac job, and the "1" indicates that the data was from logging run #1. The same interval was selected to develop a separate relationship between the N/F ratio and the far detector count rate, designated as "FARafter1" in FIGS. 11A and 11B. This interval was selected so as not to include the sub-intervals in and near the perforations, but did have the same formation types and borehole conditions as the perforated formations. Near and far count rates were then computed from the N/F ratio across the entire logged interval (X000-X470), including the perforations. These ratio based count rates (designated as "NEARafter1R" and "FARafter1R" in FIGS. 11A and 11B) were then compared to the actual observed near and far detector count rates via the near detector and far detector overlays shown in FIGS. 11A and 11B in the two tracks to the right of the depth track. The after-frac gamma ray log (designated "GRafter1") and the N/F ratio are shown to the left of the depth track. The intervals in the well containing tagged proppant are easily seen on the overlays, where the actual near and far count rates are lower than the corresponding count rates computed from the N/F ratio. Tagged proppant is observed throughout and between the perforated intervals, and also extends outside the perforations.

In the preceding portion of the present patent application three representative methods for determining the location of tagged proppant in an induced subterranean formation fracture were described. For convenience, the first two of the three methods are briefly summarized below.

The first method utilizes the comparison of a before frac (or "pre-frac") neutron count rate, preferably from a compensated neutron tool (CNT) detector, with a corresponding after frac (or "post-frac") neutron count rate. If the borehole fluid and borehole conditions are the same in the before frac and after frac logging runs, and the same tool and neutron source is used in the before frac and after frac logging runs, an overlay is made of the before frac and after frac count rate logs (an overlay being a form of comparing the data of the two logging runs), and separation areas between the two log lines (at which the count rate value of the before frac log is greater than the count rate value of the after frac log) are indicative of proppant. However, if borehole fluids are different in the before and after frac logging runs, or different logging tools are used therein, the before frac log is normalized, with respect to both count rate and count rate ratio, in zones of no interest (i.e., zones remote from formation zones expected to have proppant therein such as zones remote from casing perforations) before the before frac/after frac logging run neutron count rate overlay is made to determine proppant locations.

The development of the second proppant location detection method arose from the design realization that a change in the formation gas saturation/hydrogen index (HI) between the before frac and after frac logging runs could substantially lessen the proppant detection accuracy of the count rate comparison-based first method. Accordingly, as an adjunct to the first method, to check for formation hydrogen index changes between the before and after frac logging runs, the count rate ratio (N/F) portion of the before frac logging run in zones of no interest was normalized to remove in a comparison of the before and after frac count rates the effects of (1) changes in borehole fluids and (2) the use of different tools and/or neutron sources in the before and after frac logging runs, etc. The normalized before frac count rate ratio, which is sensitive to hydrogen index changes but not to proppant presence, was then plotted against the after frac count rate ratio. A match of this count rate ratio overlay indicated that the formation hydrogen index had not appreciably changed between the before and after frac logging runs, and the previously described count rate comparison technique of the first method was used to locate tagged proppant in the formation.

However, a non-match of the count rate ratio overlay was found to be indicative of a change in formation hydrogen index between the before and after frac logging runs. The second proppant location detection method was developed to factor out this discovered formation hydrogen index change. Using only the after frac log, the second method achieved this goal by determining the relationships between N/F and the individual detector count rates in zones which did not contain proppant. These relationships were then used to predict count rates in proppant-containing zones which would be unaffected by whether or not proppant is present. This proppant-free predicted/computed count rate log could then be compared with the actual observed count rate log to locate the tagged proppant, lowered count rate areas on the actual count rate log being indicative of tagged proppant containing zones.

Despite its advantageous elimination of hydrogen index change sensitivity in detecting tagged proppant, and the ability to be performed using only an after frac log, this second proppant detection method was found to also have limitations related to changes in formation lithology (i.e., the nature of rock structure, such as limestone vs. sandstone) in different formation zones. Specifically, if the lithology was different between the zones where the count rate vs. N/F relationship is developed relative to the zones of interest, the lithology change could cause the predicted count rates determined using the after frac log to be in error, since the N/F vs. count rate relationship is a function not only of formation hydrogen index, but also formation lithology.

One way to minimize this lithology-induced error might be to choose an interval wherein the N/F vs. count rate relationship is developed to have the same lithology as that present in the zones of interest. That, however, requires knowledge of lithology, and even then may not be possible if an interval to develop the relationship cannot be found with the same lithology as the zones of interest. Furthermore, a log comparison overlay of the computed vs. observed after frac logs would look anomalous in the zones where the lithology is different.

To provide a desirable lithology independent hydrogen index corrected method to locate tagged proppant, a third tagged proppant detection method, which was also mentioned earlier, was developed. This third method, which is preferably carried out using a compensated neutron logging tool, but which could alternatively be carried out using a pulsed neutron capture type logging tool, incorporates features of both of the above-described first and second methods. Specifically, like the first method (one which uses only before-frac versus after-frac count rate comparisons), both before and after frac logs are required. And like the second method, the N/F ratio is used in the interpretation process (the second method utilizes comparisons of count rates computed from the N/F ratio with observed count rates). The lithology-related problem with the second method is graphically depicted in FIG. 12 in which the N/F vs. count rate relationships are illustrated for two different formation lithologies, labeled lithology #1 (representatively the lithology of a zone of interest) and lithology #2 (representatively the lithology of a normalization zone which does not contain perforations or fractures).

As can be seen, for an observed near/far detector count ratio $N/F_o$ on the after frac log of the second method, different computed count rates $CR_1$ and $CR_2$ would be respectively indicated for lithology #1 vs. lithology #2. Although the difference between the two lithologies in FIG. 12 is exaggerated for illustrative clarity, it is clear that if the lithology is different in the zones in a well where the N/F vs. count rate relationship is developed than in a zone of interest, the computed count rate of the second method in the zone of interest will be in error. This will cause the difference between the computed vs. the observed after frac count rates to be affected not only by tagged proppant, but also by the different lithologies as well.

FIG. 13 shows the same two lithology vs. N/F relationships as shown in FIG. 12. However, in FIG. 13 the effect of a change in count rate ratio N/F between two logs (such as the before and after frac logs) to produce a change in count rates is illustrated. It is to be noted that for a given change in N/F (i.e., $\Delta N/F$), the change in count rate $\Delta CR$ related to $\Delta N/F$ is more or less independent of which lithology is present. Specifically, using a given $\Delta N/F$ between before and after frac logging passes, a projection of $\Delta N/F$ onto the lithology #1 curve yields a $\Delta CR_{L1}$ which is substantially equal to $\Delta CR_{L2}$ resulting from a projection of $\Delta N/F$ onto the lithology #2 curve.

Therefore, in using $\Delta N/F$, it is not critical that the lithology in the zone where the N/F vs. count rate relationship is developed be the same as that in the zones of interest. In a fractured interval of interest in a wall, if a comparison is made of the difference in N/F between a before frac log and an after frac log, this difference, $\Delta N/F=N/F$ (before frac)$-N/F$ (after frac), will be due to a change in formation hydrogen index between the two logs, and will be substantially insensitive to the presence or absence of tagged proppant. ΔN/F is independent of the presence of tagged proppant since it is derived from two N/F measurements, each of which is independent of tagged proppant (see FIG. 9). ΔN/F is also more or less independent of the lithology in the zone of interest for reasons described above.

Figure 14:
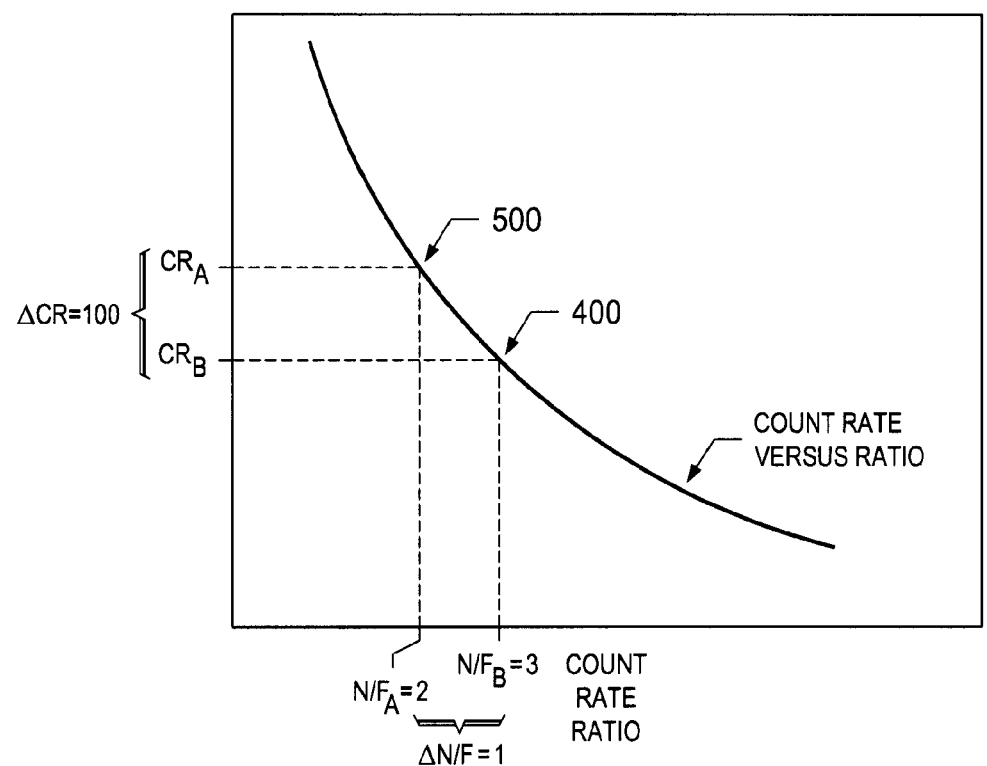
FIG. 14 is a plot of the functional relationship between detector count rate and count rate ratio, using either after-frac or normalized pre-frac data, serving to illustrate the technique utilized in the improved lithology-independent proppant location method.

FIG. 14 plots a count rate CR vs. count rate ratio N/F, obtained from either after frac data (as in the previously described second proppant location method) or from normalized before frac data (as in the previously described first proppant location method) and depicts the performance of the third method of locating tagged proppant in a subterranean formation.

With reference to FIG. 14, the third proppant location method is illustratively carried out in the following manner. A computation is first made of the differences in the count rate ratio N/F between the actual/observed before and after frac logs in each zone in the well (after any normalization for a change in borehole fluid between the logs). Those ΔN/F count rate ratio differences can then be converted to differences in count rates between the logs, expressed as ΔCR in FIG. 14, caused by changes in hydrogen index. This conversion uses a functional relationship developed between count rate ratio and count rate on the before frac log data similar to one of the curves in FIG. 12. It should be remembered that even though that relationship may be developed in zones with a different lithology from the lithology in the frac zones, the ΔN/F utilized in computing ΔCR is essentially lithology independent. Since the relationship between N/F and count rate is non-linear, ΔCR is a function, g, of ΔN/F and N/F as follows:

$$\Delta CR = g(N/F, \Delta N/F).$$

Once ΔCR is developed for each depth interval in the well, the computed before frac count rate, corrected for the difference in hydrogen index between the before frac and after frac logs is given by:

$$CR(\text{before frac,corrected}) = CR(\text{before frac,observed}) + \Delta CR$$

If ΔN/F is positive, ΔCR will be positive. If ΔN/F is negative, ΔCR will be negative. If ΔN/F is zero, ΔCR will be zero. If the after frac count rates are lower than the corrected before frac count rates after these corrections for differences in hydrogen index are made, then the lower count rate on the after frac log will be due to the presence of tagged proppant. It should be noted that the ΔCR correction could equally well be applied to correct the after frac count rates instead of the before frac count rates for hydrogen index differences between the logs.

A key feature of the third method is the utilization of the change in N/F between the before and after frac logs, which is essentially lithology independent, to correct for hydrogen index changes between the logs. In the previously described second proppant location method, N/F (which is lithology dependent), rather than the change in N/F, was used to correct hydrogen index effects in the zones of interest.

A computational example for the use of the third method is shown in FIG. 14 which depicts a cross-plot of the count rate CR vs. N/F ratio. The illustrated count rate vs. count rate ratio curve may be obtained either from after frac data (as in the previously described second method) or from normalized before frac data (as in the previously described first method). Assuming that the first method borehole fluid normalization was correctly performed, the two curves will be substantially identical.

In the FIG. 14 example, the ΔN/F between the before and after frac ratios $N/F_B$ and $N/F_A$ is representatively equal to 1 (3-2 on the ratio line), with the associated ΔCR between the before and after count rates $CR_B$ and $CR_B$ being 100 (500-400 on the count rate line). Using the previously described third method, the hydrogen index-corrected before frac count rate is given by:

$$CR(\text{before frac,corrected}) = CR_B(400) + \Delta CR(100) = 500.$$

This lithology independent process is completed for every depth of interest in the well. Using this technique in carrying out the third method, the lithology-independent hydrogen-index corrected before frac logging pass count rate (in either detector) is compared to the corresponding observed count rate in the after frac logging pass in the same detector, with tagged proppant being indicated from suppression in the after frac count rate relative to the hydrogen index corrected before frac count rate.

As described earlier, this same method 3 process can be used when borehole conditions (instead of, or in addition to, lithology) are different in the intervals of the well used for developing the count rate vs. N/F ratio relationships used to correct count rates for hydrogen index effects relative to borehole conditions in intervals where fractures might be present. Method 3 is thus both lithology independent and borehole condition independent. As used herein, the terms "lithology independent" and "borehole condition independent" mean that most, but not necessarily all, of these effects have been removed when method 3 is utilized.

EXAMPLE 2

PNC Tool

A PNC system having a 14-MeV pulsed neutron generator was modeled using MCNP5 to determine the height of a fracture in a formation. Decay curve count rate data detected in thermal neutron or gamma ray sensors are recorded after fracturing the formation. As in the case of neutron and compensated neutron tools, the observed parameters are then compared to corresponding values recorded in a logging run made before the well was fractured, again preferably made with the same or a similar logging tool and with the same borehole fluid and borehole conditions as the post-fracture log. The formation and borehole thermal neutron absorption cross-sections are calculated from the two-component decay curves. Increases in the formation and borehole thermal neutron absorption cross-sections in the post-fracture PNC logs relative to the pre-fracture logs, as well as decreases between the logs in the observed count rates and in computed formation and/or borehole component count rates and count rate integrals are used to identify the presence of boron carbide doped proppant in the induced fracture(s) and/or in the borehole region adjacent to the fractured interval.

A PNC tool can be used for data collection and processing to enable observation of both count rate related changes and changes in computed formation and borehole thermal neutron capture cross-sections so as to identify the presence of the neutron absorber in the proppant.

In current "dual exponential" PNC tools, as disclosed in SPWLA Annual Symposium Transactions, 1983 paper CC entitled Experimental Basis For A New Borehole Corrected Pulsed Neutron Capture Logging System (Thermal Multi-gate Decay "TMD") by Shultz et al.; 1983 paper DD entitled Applications Of A New Borehole Corrected Pulsed Neutron Capture Logging System (TMD) by Smith, Jr. et al.; and 1984 paper KKK entitled Applications of TMD Pulsed Neutron Logs In Unusual Downhole Logging Environments by Buchanan et al., the equation for the detected count rate c(t), measured in the thermal neutron (or gamma ray) detectors as a function of time between the neutron bursts can be approximated by Equation 1:

$$c(t) = A_{bh}\exp(-t/\tau_{bh}) + A_{fm}\exp(-t/\tau_{fm}),$$

where t is time after the neutron pulse, $A_{bh}$ and $A_{fm}$ are the initial magnitudes of the borehole and formation decay components at the end of the neutron pulses (sometimes called bursts), respectively, and $\tau_{bh}$ and $\tau_{fm}$ are the respective borehole and formation component exponential decay constants. The borehole and formation component capture cross-sections $\Sigma_{bh}$ and $\Sigma_{fm}$ are inversely related to their respective decay constants by the relations:

$$\tau_{fm} = 4550/\Sigma_{fm}, \text{ and } \tau_{bh} = 4550/\Sigma_{bh},$$

where the cross-sections are in capture units and the decay constants are in microseconds.

An increase in the capture cross-section $\Sigma_{fm}$ will be observed in the post-fracture logs with proppant in the formation fractures relative to the pre-fracture pulsed neutron logs. Fortunately, due to the ability in PNC logging to separate the count rate signals from the borehole and formation, there will also be a reduced sensitivity in the formation capture cross-section to any unavoidable changes in the borehole region (such as borehole salinity or casing changes) between the pre-fracture and post-fracture pulsed neutron logs, relative to situations in which neutron or compensated neutron tools are used to make the measurements.

The formation component count rate will also be affected (reduced) by the presence of boron-containing absorbers in the proppant in the fractures, especially in PNC tools having gamma ray detectors. The formation component count rate will also be reduced with boron present in the borehole region, since many of the thermal neutrons primarily decaying in the formation may actually be captured in the borehole region (this is the same reason a large number of iron gamma rays are seen in spectra from time intervals after the neutron bursts dominated by the formation decay component, although the only iron present is in the well tubular(s) and tool housing in the borehole region).

Since most modern PNC tools also measure the borehole component decay, an increase in the borehole capture cross-section $\Sigma_{bh}$ and a change in the borehole component count rate (especially if boron carbide is used as the high thermal neutron capture cross section material) in the post-fracture log relative to the pre-fracture log could indicate the presence of proppant in the vicinity of the borehole, which is also usually indicative of the presence of induced fracturing in the adjacent formation.

Figure 6A:
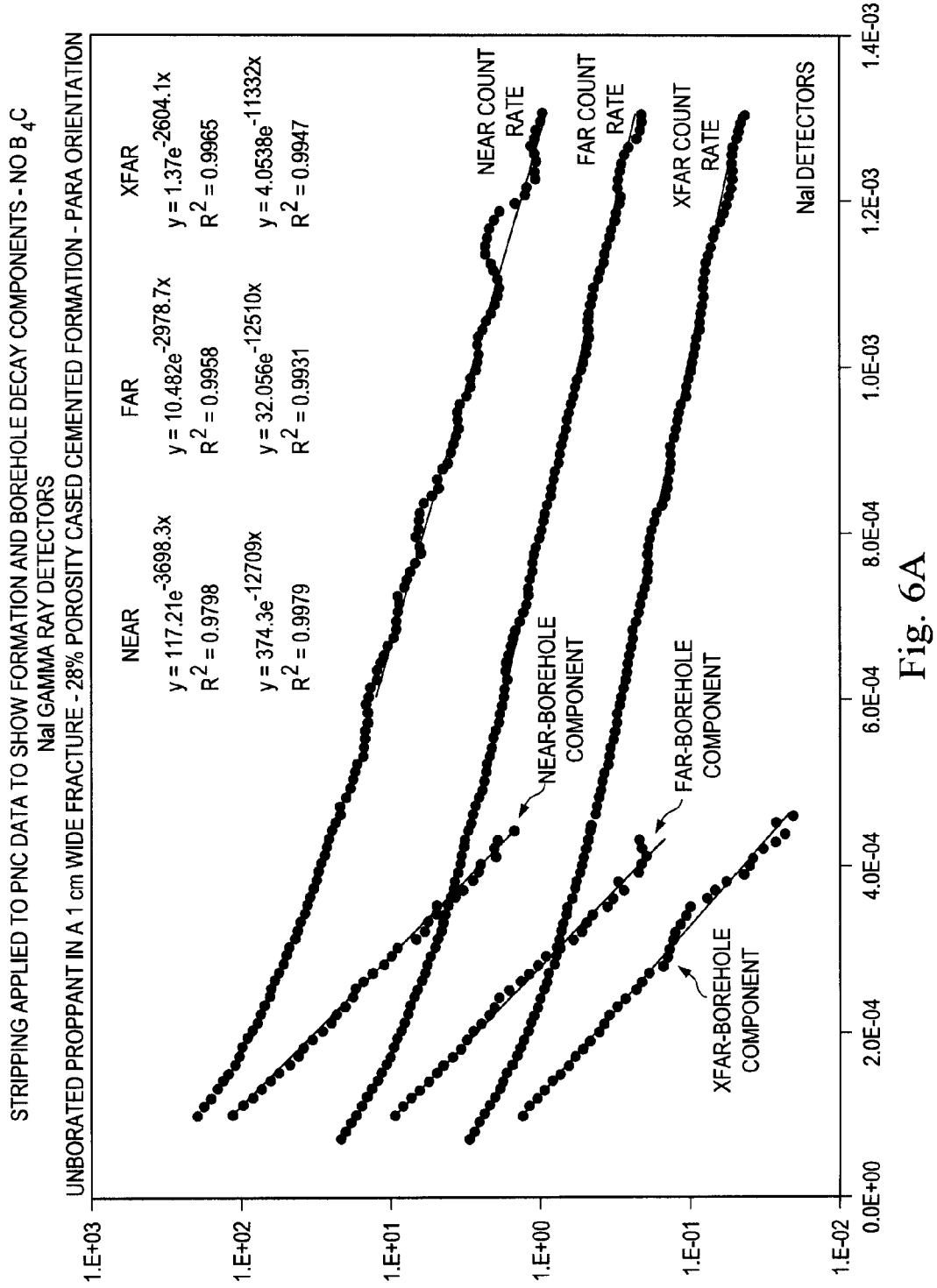
FIGS. 6A-6B show modeled points along the decay curves of detected thermal neutron capture gamma rays using a 14 MeV Pulsed Neutron Generator.
Figure 6B:
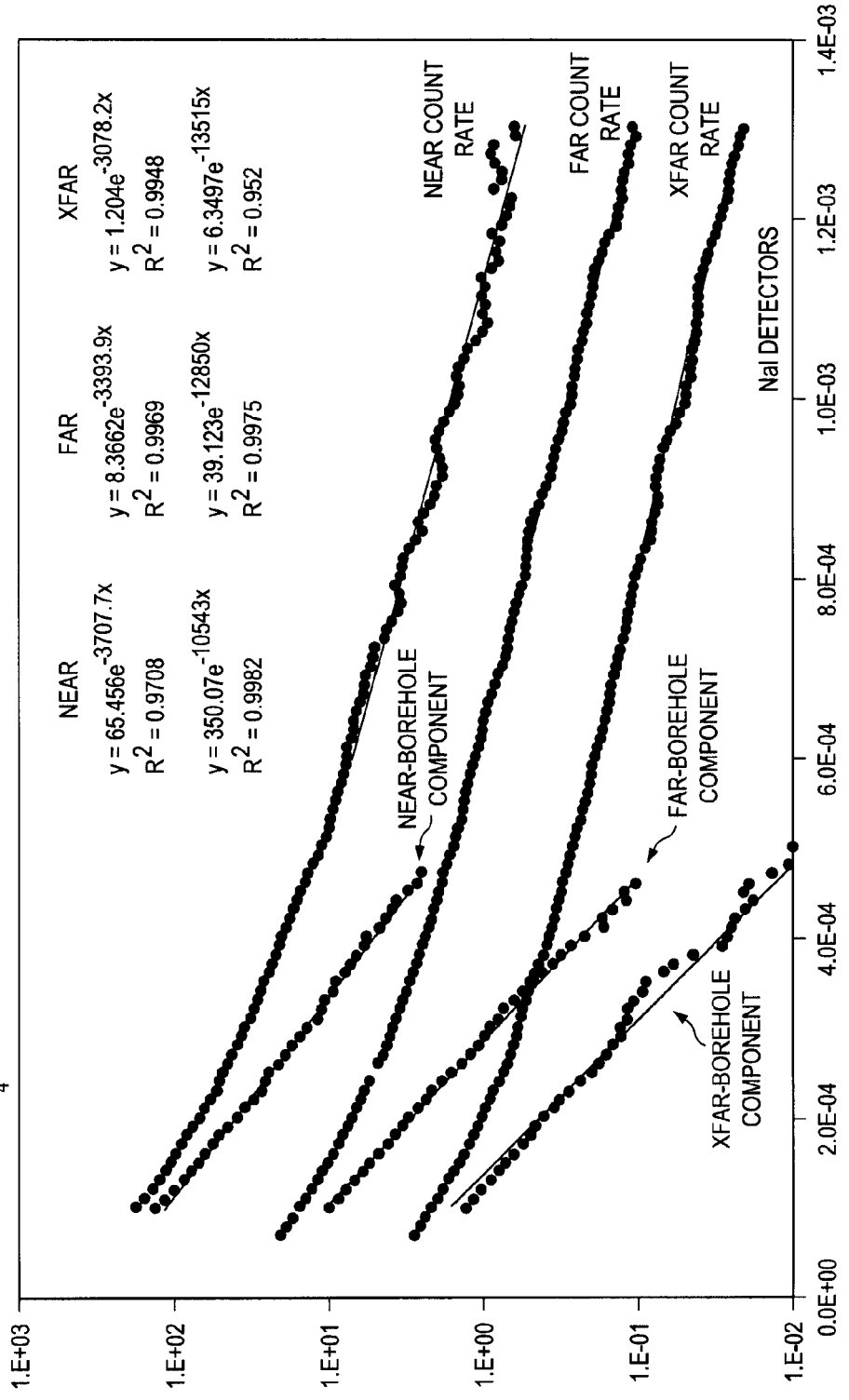
Figure 6C:
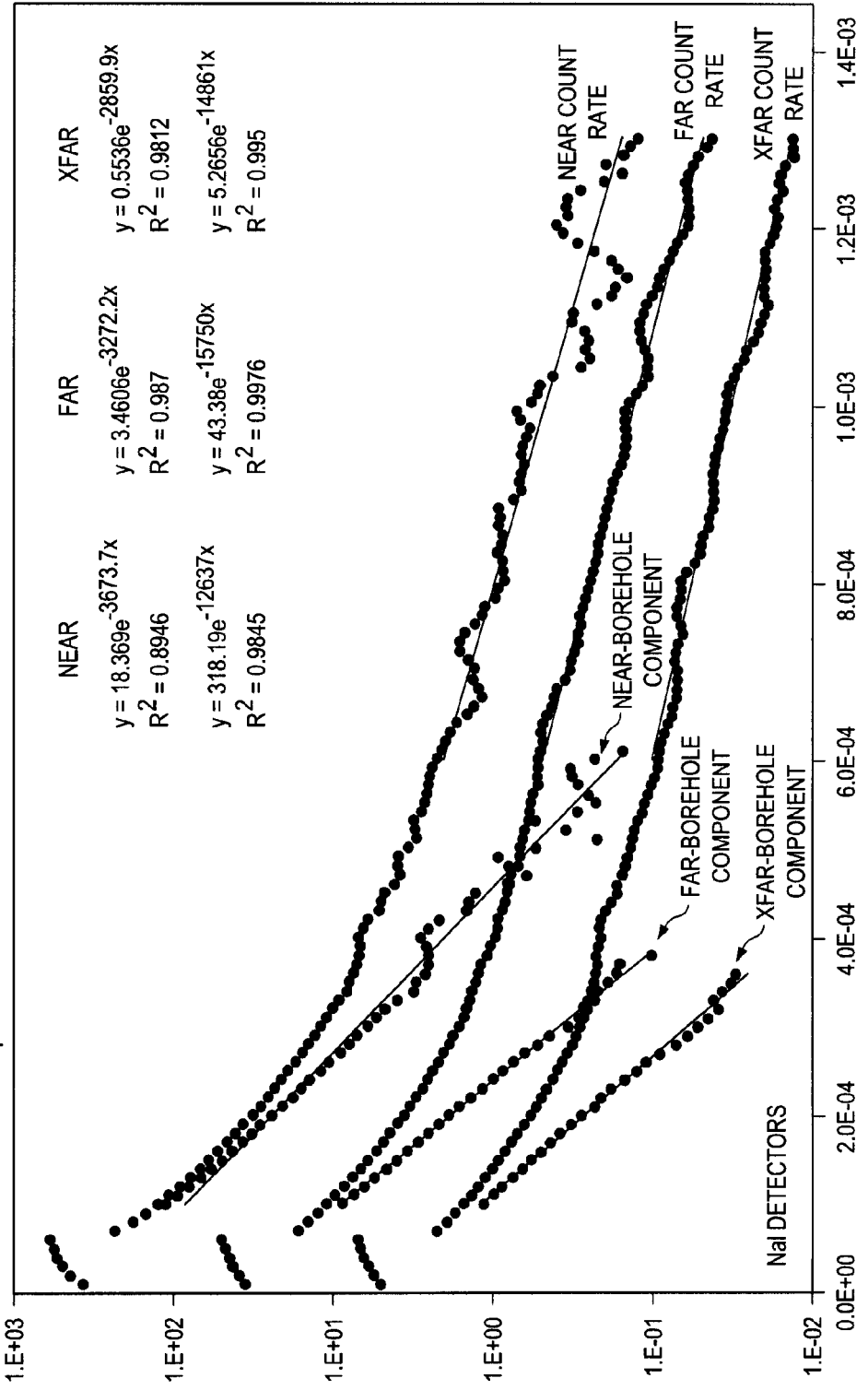
FIG. 6C shows similar decay curves obtained with tagged proppant in the borehole annulus instead of the formation fractures.

FIGS. 6A-6C and Tables 5A and 5B show MCNP5 modeled results for the PNC tool embodiment of the present invention. NaI gamma ray detectors were used in all of the PNC models. The data was obtained using a hypothetical 1.6875 inch diameter PNC tool to collect the pre-fracture data (FIG. 6A), and the post-fracture data (FIG. 6B) data with proppant having 1.0% boron carbide in a 1.0 cm wide fracture in a 28.3% porosity formation. FIG. 6C illustrates post-fracture data with proppant having 1.0% boron carbide proppant in the annular (cement) region instead of in the fractures in the formation. Unless otherwise noted, borehole fluid and borehole and formation conditions are the same as described in FIG. 3A. The source-detector spacings are the same as those utilized in the previous neutron log examples. In FIGS. 6A-6C, the total count rates in each time bin along each of the decay curves are represented as points along the time axis (x axis). The near detector decay is the slowly decaying upper curve in each figure, the far detector decay is the center curve, and the x-far detector decay is the lower curve. The computed formation decay components from the two exponential fitting procedures are the more slowly decaying exponentials (the solid lines in the figures) plotted on the total decay curve points in each figure (for each detector). The divergence of the decay curve in the earlier portions of the curve from the solid line is due to the additional count rate from the more rapidly decaying borehole component. The points representing the more rapidly decaying borehole region decay shown in the figures were computed by subtracting the computed formation component from the total count rate. Superimposed on each of the points along the borehole decay curves are the lines representing the computed borehole exponential equations from the two exponential fitting algorithms. The $R^2$ values associated with each computed exponential component in FIGS. 6A-6C reveal how closely the computed values correlate to the actual data, with 1.0 indicating a perfect fit. The good fits between the points along the decay curves and the computed formation and borehole exponential components confirm the validity of the two exponential approximations.

Table 5A displays the computed formation and borehole information from FIGS. 6A and 6B, and also similar information from decay curves computed with the fractures in the perp orientation relative to the tool (see FIG. 3B). As seen in Table 5A, although the formation component capture cross-sections, $\Sigma_{fm}$, are not observed to change as much as would be computed from purely volumetric considerations, there are nevertheless appreciable (up to 18%) increases observed in $\Sigma_{fm}$ with the boron carbide doped proppant in the fracture, depending on detector spacing. Also from Table 5A, it can be seen that the orientation of the tool in the borehole relative to the fracture (para vs. perp data) is not as significant as was observed for the compensated neutron tools. When 0.27% $Gd_2O_3$ (as opposed to 1.0% $B_4C$) was modeled in the MCNP5 software as the high capture cross section material in the proppant, $\Sigma_{fm}$ increased in a similar manner as discussed above with respect to boron carbide. Also, from Equation 1, the integral over all time of the exponentially decaying count rate from the formation component as can be computed as $A_{fm}*\tau_{fm}$, where $A_{fm}$ is the initial magnitude of the formation decay component and $\tau_{fm}$ is the formation component exponential decay constant. The computed formation component $A_{fm}*\tau_{fm}$ count rate integral decreases about 22-44% with the boron carbide doped proppant in the fracture, which is a significant fracture signal. The observed count rate decay curves summed over a given time interval after the neutron bursts in which the formation component count rate dominates (for example 400-1000 μsec) could be substituted for $A_{fm}*\tau_{fm}$, however with some reduction in sensitivity and/or accuracy. In contrast to proppant containing 1.0% $B_4C$, when 0.27% $Gd_2O_3$ was modeled in the MCNP5 software as the high capture cross section material in the proppant, there was not a large count rate related decrease in $A_{fm}*\tau_{fm}$, since gadolinium, unlike boron, emits gamma rays following thermal neutron capture. Some changes are also observed in Table 5A for the borehole component cross-sections and count rates. These changes, although also potentially useful for frac identification, do not appear to be as systematic as the changes in the formation component data, since proppant in formation fractures primarily affects PNC formation, as opposed to borehole, parameters.

TABLE 5A

Computed formation and borehole count rate parameters and formation and borehole capture cross-sections from the data illustrated in FIGS. 6A-6B. Also shown are similar PNC data for perp orientation of tool relative to the fracture. Plain cement is present in the borehole annulus. NaI gamma ray detectors modeled.

| Detector | $B_4C$ in proppant | $\Sigma_{fm}$ capture units | $\tau_{fm}$ microsec. | Formation component intercept | Formation $A_{fm}*\tau_{fm}$ ($\times 1/1000$) | $\Sigma_{bh}$ capture units | $\tau_{bh}$ microsec. | Borehole component intercept | Borehole $A_{bh}*\tau_{bh}$ ($\times 1/1000$) |
|---|---|---|---|---|---|---|---|---|---|
| Near para | 0% | 16.81 | 270.6722 | 117.21 | 31.725491 | 57.82 | 78.69249 | 374.3 | 29.4546 |
| | 1% | 16.85 | 270.0297 | 65.46 | 17.676142 | 47.97 | 94.85095 | 350.07 | 33.20447 |
| (1%-0%)/0% | | 0.0% | | | −44% | −17% | | | 13% |
| Far para | 0% | 13.54 | 336.0414 | 10.48 | 3.5217134 | 56.92 | 79.93675 | 32.06 | 2.562772 |
| | 1% | 15.43 | 294.8801 | 8.37 | 2.4681465 | 58.46 | 77.831 | 39.12 | 3.044749 |
| (1%-0%)/0% | | 14% | | | −30% | 3% | | | 19% |
| Xfar para | 0% | 11.84 | 384.2905 | 1.37 | 0.526478 | 51.56 | 88.2467 | 4.05 | 0.357399 |
| | 1% | 13.99 | 325.2323 | 1.2 | 0.3902788 | 61.49 | 73.99577 | 6.35 | 0.469873 |
| (1%-0%)/0% | | 18% | | | −26% | 19% | | | 31% |
| Near perp | 0% | 17.55 | 259.2593 | 137.21 | 35.572963 | 58.83 | 77.34149 | 299.3 | 23.14831 |
| | 1% | 18.84 | 241.5074 | 103.69 | 25.041906 | 57.87 | 78.6245 | 407.2 | 32.0159 |
| (1%-0%)/0% | | 7% | | | −30% | −1.6% | | | 38% |
| Far perp | 0% | 13.11 | 347.0633 | 9.57 | 3.3213959 | 51.69 | 88.02476 | 30.56 | 2.690037 |
| | 1% | 14.69 | 309.7345 | 8.08 | 2.5026549 | 51.64 | 88.10999 | 31.65 | 2.788681 |
| (1%-0%)/0% | | 12% | | | −25% | 0.0% | | | 4% |
| Xfar perp | 0% | 11.79 | 385.9203 | 1.33 | 0.513274 | 43.98 | 103.4561 | 3.08 | 0.318645 |
| | 1% | 13.64 | 333.5777 | 1.2 | 0.4002933 | 49.95 | 91.09109 | 3.74 | 0.340681 |
| (1%-0%)/0% | | 16% | | | −22% | 14% | | | 7% |

TABLE 5B

Computed formation and borehole count rate parameters and formation and borehole capture cross-sections with 0.2% $B_4C$ in the annular (cement) region. There is no $B_4C$ in the proppant in the fractures. NaI gamma ray detectors modeled.

| Detector | $B_4C$ in proppant | $\Sigma_{fm}$ capture units | $\tau_{fm}$ microsec. | Formation component intercept | Formation $A_{fm}*\tau_{fm}$ ($\times 1/1000$) | $\Sigma_{bh}$ capture units | $\tau_{bh}$ microsec. | Borehole component intercept | Borehole $A_{bh}*\tau_{bh}$ ($\times 1/1000$) |
|---|---|---|---|---|---|---|---|---|---|
| Near | 0% | 16.81 | 270.6722 | 117.21 | 31.725491 | 57.82 | 78.69249 | 374.3 | 29.4546 |
| Para | only 0.2% | 18.25 | 249.3151 | 58.2 | 14.510137 | 71.6 | 63.54749 | 622.3 | 39.5456 |
| (0.2%-0%)/0% | | 9% | | | −54% | 24% | | | 34% |
| Far | 0% | 13.54 | 336.0414 | 10.48 | 3.5217134 | 56.92 | 79.93675 | 32.06 | 2.562772 |
| Para | only 0.2% | 14.35 | 317.0732 | 5.43 | 1.7217073 | 60 | 75.83333 | 38.4 | 2.912 |
| (0.2%-0%)/0% | | 6% | | | −51% | 5% | | | 14% |
| Xfar | 0% | 11.84 | 384.2905 | 1.37 | 0.526478 | 51.56 | 88.2467 | 4.05 | 0.357399 |
| Para | only 0.2% | 12.89 | 352.9868 | 0.853 | 0.3010978 | 60.3 | 75.45605 | 5.16 | 0.389353 |
| (0.2%-0%)/0% | | 9% | | | −43% | 17% | | | 9% |

FIG. 6C indicates that increases in formation, and particularly borehole, component cross sections, and large decreases (up to 85% reductions) in both formation and borehole component count rates are observed with 1.0% $B_4C$ tagged proppant filling the cement annulus. However, since it is unlikely that the entire borehole annulus would be filled with proppant, similar modeling data was also collected representing more realistic partial filling of the annulus with tagged proppant. Table 5B represents data collected to show the effects of 0.2% $B_4C$ doped proppant in the borehole annulus (cement region) on PNC tools. This $B_4C$ concentration is representative of a 20% fill of the annulus with a proppant tagged with 1% $B_4C$. $\Sigma_{fm}$ and $\Sigma_{bh}$ increase with the proppant in the borehole annulus. Particularly with proppant in the annulus, the computed formation component count rate $A_{fm}*\tau_{fm}$ decreases substantially—about 50%. $A_{bh}*\tau_{bh}$ can change as well, but not nearly as much. These changes indicate propped fractures, given the assumption that some of the borehole region adjacent to the propped fractured interval also contains the tagged proppant.

The effects described in Tables 5A and 5B can also be seen by visual observation of the decay curves in FIGS. 6A-6C. In comparing the three pre-fracture decay curves in FIG. 6A with the corresponding post-fracture curves in FIG. 6B and FIG. 6C, the formation components can be seen to decay more rapidly with the boron carbide doped proppant in the formation fractures (FIG. 6B), and also slightly with the boron carbide doped proppant in the cement annulus (FIG. 6C). On the other hand, the decay rates of the borehole components appear much less sensitive to the presence of the proppant in the fracture (FIG. 6B), but are very useful in identifying borehole proppant (FIG. 6C).

This reduced borehole component sensitivity to the proppant in the fracture can also be seen in the data in Table 5A, which shows $\Sigma_{bh}$ and $A_{bh}*\tau_{bh}$ computed from the decay data in FIGS. 6A and 6B for the pre-fracture and post-fracture decay curves. There are much smaller percentage changes in the borehole parameters $\Sigma_{bh}$ and $A_{bh}*\tau_{bh}$ between the pre-fracture and post-fracture decay data as compared to the percent change of the formation parameters $\Sigma_{fm}$ and $A_{fm}*\Sigma_{fm}$. This reduced borehole component sensitivity to the fracture is primarily due to the fact that the borehole region is not significantly different in these two situations (the fracture containing the proppant does not extend through the borehole region), and the borehole component is primarily sensing this region.

PNC formation parameters, as described earlier, are less sensitive than neutron or compensated neutron to changes in non-proppant related changes in borehole fluid and borehole conditions between the pre-fracture and post-fracture logs (such as borehole fluid salinity changes or changes in casing conditions). This is due to the ability of PNC systems to separate formation and borehole components. This can be seen in the data in Table 6, where the salinity of the borehole fluid was changed from fresh water to salt water (102 Kppm NaCl). The formation parameters are virtually insensitive to this change, while both borehole parameters are highly sensitive to the salinity change. Hence formation parameter changes due to the presence of tagged proppant will not be influenced by borehole changes between log runs. Also, changes in borehole parameters, coupled with the absence of changes in formation parameters, can be used to identify the places where the borehole region has changed between logs, since that change may also be of interest.

is desired to emphasize detection of tagged proppant in the formation as opposed to tagged proppant in the borehole region. On the other hand, if some of the boron carbide doped proppant is located in the borehole region adjacent to an induced fracture, an increase in the computed borehole thermal neutron capture cross-section $\Sigma_{bh}$ will be observed in the post-fracture log relative to the pre-fracture log (changes in the borehole decay component count rates and $A_{bh}*\tau_{bh}$ would be less significant). These borehole parameter changes would be much less pronounced if the proppant had been in fractures in the formation. Another embodiment of the present invention provides for monitoring changes in $\Sigma_{bh}$ and $A_{fm}*\tau_{fm}$, and in come cases, $A_{bh}*\tau_{bh}$, (and a lack of change in $\Sigma_{fm}$) to detect proppant located in the borehole region.

An exemplary well log comparison of pre-fracture and post-fracture logs using a PNC tool with a capture gamma ray detector or a thermal neutron detector is shown in FIG. 7B, which is representative of data received from one of the

TABLE 6

A 102 Kppm NaCl Change in Borehole Salinity affects PNC Borehole Parameters but not PNC Formation Parameters
Porosity = 28% - No B$_4$C in Fracture or Annulus - NaI Gamma Ray Detectors

| Detector | Borehole salinity (Kppm NaCl) | $\Sigma_{fm}$ capture units | $\tau_{fm}$ microsec. | Formation component intercept | Formation $A_{fm}*\tau_{fm}$ (×1/1000) | $\Sigma_{bh}$ capture units | $\tau_{bh}$ microsec. | Borehole component intercept | Borehole $A_{bh}*\tau_{bh}$ (×1/1000) |
|---|---|---|---|---|---|---|---|---|---|
| Near | 0K | 16.81 | 270.6722 | 117.2 | 31.722784 | 57.82 | 78.69249 | 374.3 | 29.4546 |
|  | 102K | 17.06 | 266.7057 | 114.7 | 30.591149 | 89.24 | 50.9861 | 712.3 | 36.3174 |
| (102K-0K)/0K |  | 1% |  |  | -4% | 54% |  |  | 23% |
| Far | 0K | 13.53 | 336.2897 | 10.48 | 3.5243163 | 56.92 | 79.93675 | 32.06 | 2.562772 |
|  | 102K | 13.39 | 339.8058 | 9.33 | 3.1703883 | 69.5 | 65.46763 | 43.32 | 2.836058 |
| (102K-0K)/0K |  | 1% |  |  | -10% | 22% |  |  | 11% |
| Xfar | 0K | 11.84 | 384.2905 | 1.37 | 0.526478 | 51.56 | 88.2467 | 4.05 | 0.357399 |
|  | 102K | 12.17 | 373.8702 | 1.37 | 0.5122021 | 58.01 | 78.43475 | 5.59 | 0.43845 |
| (102K-0K)/0K |  | 3% |  |  | -3% | 13% |  |  | 23% |

Modern multi-component PNC tools detect gamma rays, which can be used to compute formation decay components (and hence both $\Sigma_{fm}$ and $A_{fm}*\tau_{fm}$) that are only minimally sensitive to most borehole region changes, as seen above. If a PNC tool measuring thermal neutrons instead of gamma rays is employed, $\Sigma_{fm}$ will also be sensitive to formation changes (tagged fractures) and relatively insensitive to borehole region changes. $A_{fm}*\tau_{fm}$ will also be sensitive to the presence of proppant in the borehole, in part since the thermal neutrons will be additionally attenuated traversing this high capture cross-section borehole annulus between the formation and the detectors in the logging tool. The borehole decay parameters ($\Sigma_{bh}$ and $A_{bh}*\tau_{bh}$), like those measured in a PNC tool containing gamma ray detectors, are less sensitive than $\Sigma_{fm}$ and $A_{fm}*\Sigma_{fm}$ to changes in the formation, but borehole parameters, and especially $\Sigma_{bh}$, are very sensitive to tagged proppant in the borehole. Hence in a PNC tool containing thermal neutron detectors, the changes in all four parameters ($\Sigma_{fm}$, $A_{fm}*\tau_{fm}$, $\Sigma_{bh}$ and $A_{bh}*\tau_{bh}$) will generally be affected in the same way by tagged proppant as PNC tools containing gamma ray detectors. If boron is used as the high cross section proppant tagging material, the observed count rate decreases will likely be relatively smaller in tools with thermal neutron detectors than in tools with gamma detectors, due to the aforementioned absence of capture gamma rays following neutron capture by boron.

Changes in $\Sigma_{fm}$ and $A_{fm}*\tau_{fm}$ may be monitored if a difficult to quantify change in borehole region parameters (such as changes in borehole fluid salinity or casing conditions) has occurred between the log runs. Since $\Sigma_{fm}$ is not very sensitive to changes in the borehole region, $\Sigma_{fm}$ may be monitored if it detectors (i.e. the near, far, or x-far detectors). The proppant used in the frac was tagged with a high thermal neutron capture cross section material. Normalization of the pre-fracture and post-fracture logs in interval(s) outside of the suspected fractured interval may be required prior to making the comparison. $\Sigma_{fm}$ increases and $A_{fm}*\tau_{fm}$ decreases with tagged proppant only in the fracture, however $\Sigma_{bh}$ and $A_{bh}*\tau_{bh}$ have only limited sensitivity to fracture (formation) proppant. With tagged proppant only in the borehole, $\Sigma_{fm}$ is minimally affected, since borehole region changes do not tend to influence $\Sigma_{fm}$. $A_{fm}*\tau_{fm}$ decreases in the post-fracture log. $\Sigma_{bh}$ and $A_{bh}*\tau_{bh}$ are also both sensitive to the presence of tagged proppant in the borehole region ($\Sigma_{bh}$ increases and $A_{bh}*\tau_{bh}$ decreases). With tagged proppant in both the borehole and formation, all four log curves separate in the interval containing the proppant. Hence, since the four PNC log parameters ($\Sigma_{fm}$, $A_{fm}*\tau_{fm}$, $\Sigma_{bh}$ and $A_{bh}*\tau_{bh}$), when observed together, respond differently in all three of the above proppant location situations, one can determine whether proppant is present in the borehole region, or in a fracture, or in both by observing the changes, or lack of changes, in these parameters between the pre-fracture and post-fracture logs.

Although the above discussion has focused on comparing pre-fracture with post-fracture logs to detect the location of proppant tagged with high thermal neutron capture cross section materials (e.g. B$_4$C or Gd$_2$O$_3$) to indicate induced fractures, a similar comparison of two (or more) compensated neutron or PNC logs run at different times after the frac job can also provide useful information. If there is a reduction over time in the amount of tagged proppant in the fracture and/or borehole region, a reversal of the changes described above will be observed between a post-fracture log run just after the frac job with a similar log run at a later time (after making any required log normalization). Increases in neutron or compensated neutron log count rates between the logs (or decreases in $\Sigma_{fm}$ and/or $\Sigma_{bh}$, and increases in $A_{fm}*\tau_{fm}$ for PNC logs) would indicate a reduction in the amount of proppant detected when the later post-fracture log was run. This reduction in the amount of proppant in place can provide useful information about the well. Any proppant reduction is likely caused by proppant being produced out of the well together with the oilfield fluids produced from the formation. Proppant reduction could indicate that the fracture is not as well propped as it was initially (and hence the possible requirement for another frac job or other remedial action). Reduced proppant could also indicate the fractured intervals from which most of the production is coming, since proppant can only be produced from producing intervals. No change in proppant could conversely be indicative of intervals that are not producing, and hence provide information about formations that need to be recompleted. If PNC tools were used for these comparisons, it would also be possible to distinguish whether the proppant changes were coming from the borehole region or the formation fractures themselves, or both. If logs are run at multiple times after the first post-fracture log, then progressive changes could be monitored. Of course, it would also be useful to know whether a reduction in proppant detected was caused by a reduction in the quality of the propped fracture or caused by the intervals with the highest production rates, or both. Resolving these effects might be possible by augmenting the post-fracture proppant identification logs with: (1) conventional production logs, (2) gamma ray logs to locate radioactive salt deposition in intervals resulting from production, (3) acoustic logs to detect open fractures, (4) other log data, and/or (5) field information. It should be noted that this type of post-fracture information could not be obtained using fracture identification methods in which relatively short half life radioactive tracers are pumped downhole, since radioactive decay would make the subsequent post-fracture logs useless. This would not be a problem with the methods described, since the characteristics/properties of boron or gadolinium tagged proppants do not change over time. It should be noted that any possible confusion caused by changes in formation and/or fracture hydrogen index between two or more post-fracture compensated neutron logs could be dealt with in the same way as in the situation involving the pre-fracture and post-fracture logs as previously described herein.

Most of the previous discussion of the third proppant location method using compensated neutron logging tools relates to making lithology independent corrections to count rates to compensate for differences in gas saturation (hydrogen index HI) between the before and after frac logs. The prior described second method is also sensitive to borehole condition differences (as well as lithology differences) between the zones where the relationship between N/F vs. count rates are developed and the zones of interest. This third method can also be applied to making more borehole-condition-independent corrections to count rates which are used to compensate for differences in gas saturations between the before-frac and after-frac logs than is possible using the second method. Also, although the previous discussion of the third method has been illustrated in association with compensated neutron logs, it should be noted that similar methodology applies to utilization of near and far detector count rates and the associated N/F ratios developed when using PNC logging tools.

The foregoing description and embodiments are intended to illustrate the invention without limiting it thereby. It will be obvious to those skilled in the art that the invention described herein can be essentially duplicated by making minor changes in the material content or the method of manufacture. To the extent that such material or methods are substantially equivalent, it is intended that they be encompassed by the following claims.

The invention claimed is:

1. For use in conjunction with a fractureable subterranean formation traversed by a borehole, a well logging method comprising the steps of:
    performing a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and respectively generating a) a before-frac near detector count rate log and a before-frac far detector count rate log ("BF count rate logs"), and b) an after-frac near detector count rate log and an after-frac far detector count rate log ("AF count rate logs");
    generating a before-frac near/far-count-rate-ratio-log ("BFN/F ratio log") based on the BF count rate logs;
    generating an after-frac near/far-count-rate-ratio-log ("AFN/F ratio log") based on the AF count rate logs;
    generating Corrected BF count rate logs by correcting the BF count rate logs to account for any changes in one or more of borehole fluid, logging tools, and neutron source output between the before-frac and after-frac logging operations;
    generating a Corrected BF ratio log by correcting the BFN/F ratio log to account for any changes in one or more of borehole fluid, logging tools, and neutron source output between the before-frac and after-frac logging operations;
    comparing the AFN/F ratio log and the Corrected BF ratio log to determine near/far count rate ratio differentials ("N/F ratio differentials");
    computing near detector and/or far detector count rate differentials as lithology-independent and/or borehole condition independent, and hydrogen index-corrected count rate differentials based on the determined N/F ratio differentials;
    combining the computed near detector and/or far detector count rate differentials with the corresponding Corrected BF count rate logs—to yield modified before-frac near detector and/or far detector count rate logs that are a lithology-independent and/or borehole condition independent and hydrogen index-corrected before-frac count rate logs; and
    comparing the modified before-frac near detector and/or far detector count rate logs with the corresponding AF count rate logs to determine the heights/locations of high thermal neutron capture cross-section material-containing proppant in formation fractures and/or a borehole region adjacent to the fracturable subterranean formation.

2. The method of claim 1, wherein in said computing step, the near and/or far detector count rate differentials are computed utilizing relationships between corresponding near and/or far detector after-frac count rates as detected by the logging detectors and the after-frac near/far ratios in an interval of the well which does not contain tagged proppant.

3. The method of claim 1, wherein in said computing step, the near and/or far detector count rate differentials are computed utilizing relationships between corrected before-frac near and/or far detector count rates as detected by the logging detectors and the corrected before-frac near/far ratios in an interval of the well which does not contain tagged proppant.

4. For use in conjunction with a fractureable subterranean formation traversed by a borehole, a well logging method comprising the steps of:

performing a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and respectively generating a) before-frac near detector count rate measurements and before-frac far detector count rate measurements ("BF count rates") and b) after-frac near detector count rate measurements and after-frac far detector count rate measurements ("AF count rates");

generating before-frac near/far-count-rate-ratio-measurements ("BFN/F ratios") based on the BF count rates;

generating after-frac near/far-count-rate-ratio-measurements ("AFN/F ratios") based on the AF count rates;

comparing the AFN/F ratios and the BFN/F ratios to determine near/far count ratio differentials ("N/F ratio differentials");

using the N/F ratio differentials to compute near and/or far detector count rate differentials between the BF count rates and the AF count rates;

combining the computed near and/or far detector count rate differentials with corresponding count rates of either the BF count rates or the AF count rates to yield either modified before-frac count rates ("MBF count rates") as a lithology-independent and/or borehole condition independent, and hydrogen index-corrected before-frac count rates or modified after-frac count rates ("MAF count rates") as a lithology-independent and/or borehole condition independent, and hydrogen index-corrected, after-frac count rates; and comparing either the MBF count rates to the AF count rates or the MAF count rates to the BF count rates to determine the heights/locations of high thermal neutron capture cross section material-containing proppant in the formation and/or the borehole region adjacent to the fractured formation and/or the borehole region adjacent to the fractured formation, repeating the method for different depth intervals in the well.

5. The method of claim 4, wherein the near and/or far detector count rate differentials are computed from relationships between corresponding near and/or far detector after-frac count rates as detected by the logging detectors and the AFN/F ratios in an interval of the well which does not contain tagged proppant.

6. The method of claim 4, wherein the near and/or far detector count rate differentials are computed from relationships between before-frac near and/or far detector count rates and the BFN/F ratios as detected by the logging detectors and the before-frac near/far ratios in an interval of the well which does not contain tagged proppant.

7. For use in conjunction with a fractureable subterranean formation traversed by a borehole, a well logging method comprising the steps of:

performing across a well interval a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and generating a before-frac count rate, a before-frac count rate ratio, an after-frac count rate, and an after-frac count rate ratio;

developing a count rate/count rate ratio relationship from data of one of the before-frac and after-frac logging operations;

determining a count rate ratio differential between data from the before-frac and after-frac logging operations;

using the developed count rate/count rate ratio relationship to convert the count rate ratio differential to a corresponding count rate differential between the before-frac and after-frac logging operations;

creating a modified before-frac count rate ("MBF count rate") as a lithology-independent and/or borehole condition-independent hydrogen index corrected before-frac count rate by combining the count rate differential with the before-frac count rate;

overlaying data related to the after-frac count rate with data relating to the MBF count rate; and correlating areas of the overlaid data related to the after-frac count rate with data relating to the MBF count rate such that the after-frac count rate is lower than the MBF count rate, to determine heights and locations of high thermal neutron capture cross section material-containing proppant, and thus fractures, in the formation and/or the borehole region adjacent to the fractured formation.

8. For use in conjunction with a fractureable subterranean formation traversed by a borehole, a well logging method comprising the steps of:

performing across a well interval a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and generating a before-frac count rate, a before-frac count rate ratio, an after-frac count rate, and an after-frac count rate ratio;

developing a count rate/count rate ratio relationship from data of one of the before-frac and after-frac logging operations;

determining a count rate ratio differential between data from the before-frac and after-frac logging operations;

using the developed count rate/count rate ratio relationship to convert the count rate ratio differential to a corresponding count rate differential between the before-frac and after-frac logging operations;

creating a modified after-frac count rate ("MAF count rate") as a lithology-independent and/or borehole condition-independent hydrogen index corrected after-frac count rate by combining the count rate differential with the after-frac count rate;

overlaying data related to the before-frac count rate with data relating to the MAF count rate; and correlating areas of the overlaid data related to the before-frac count rate with data relating to the MAF count rate such that the MAF count rate is lower, to determine heights and locations of high thermal neutron capture cross section material-containing proppant, and thus fractures, in the formation and/or the borehole region adjacent to the fractured formation.

9. For use in conjunction with a fractureable subterranean formation traversed by a borehole, a well logging method comprising the steps of:

performing across a well interval a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and generating a before-frac count rate log and an after-frac count rate log with a respective before-frac count rate and an after-frac count rate in each of two of the detectors, and generating a before-frac count rate ratio and an after-frac count rate ratio respectively based on the before-frac count rates and the after-frac count rates from the same two detectors;

developing a relationship between the after-frac count rate ratio and the after-frac count rate in one of the same two detectors in an interval of the well which does not contain tagged proppant;

utilizing the developed relationship and the difference between the before-frac and after-frac count rate ratios of the same two detectors at a well depth of interest to compute a count rate differential between the before-frac count rate log and the after-frac count rate log in a selected detector at a well depth of interest, the computed count rate differential being related to a change in formation hydrogen index between the before-frac and after-frac count rate logs;

correcting one of the before-frac and after-frac count rate logs from the selected one of the same two detectors for the hydrogen index change between the before and after-frac count rate logs using the computed count rate differential;

comparing the corrected one of the before-frac and after-frac count rate logs with the other of the before-frac and after-frac count rate logs to develop a count rate difference between data in the before-frac count rate log and after-frac count rate log which is independent of at least one of lithology and borehole conditions;

correlating the lithology and/or borehole condition independent count rate difference to heights and locations of high thermal neutron capture cross section material-containing proppant, and thus fractures, in the formation and/or the borehole region adjacent to the fractured formation.

10. The method of claim 9 wherein in said performing step, the generated before-frac and after-frac count rate ratios and the before-frac and after-frac count rates in said two of the detectors are corrected/normalized for differences in borehole fluid, logging tool, and/or neutron source between the before-frac and after-frac logs.

11. The method of claim 9 wherein in said comparing step, the count rate difference is obtained by subtracting after-frac log data from before-frac log data.

12. The method of claim 9 comprising computing and utilizing at multiple depths traversed by the borehole, a lithology and/or borehole condition independent count rate difference.

13. The method of claim 9 wherein in the developing step, the before-frac count rate ratio and the before-frac count rate in the selected one of the same two detectors is substituted for the after-frac count rate ratio and after-frac count rate.

14. For use in conjunction with a fractureable subterranean formation traversed by a borehole, a well logging method comprising the steps of:

performing across a well interval a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and generating in at least two of the detectors a before-frac log, an after-frac log, a before-frac count rate, an after-frac count rate, a before-frac count rate ratio and an after-frac count rate ratio;

computing a count rate ratio differential between the before-frac count rate ratio and the after-frac count rate ratio;

utilizing the computed count rate ratio differential to compute a corresponding count rate differential between the before-frac and after-frac logs that takes into account a hydrogen index change between the before-frac and after-frac logs;

correcting one of the before-frac and after-frac count rates from one of the same two detectors for the hydrogen index change using the computed count rate differential;

comparing the corrected said one of the before-frac and after-frac count rates with the other one of the before-frac and after-frac count rates from the one of the same two detectors to develop a count rate difference between the before-frac and after-frac count rates which is independent of at least one of lithology and borehole conditions; and correlating the lithology and/or borehole condition independent count rate difference to heights and locations of high thermal neutron capture cross section material-containing proppant, and thus fractures, in the formation and/or the borehole region adjacent the fractured formation.

15. The method of claim 14 wherein in said performing step, the generated before-frac and after-frac count rate ratios and the before-frac and after-frac count rates in said two of the detectors are corrected/normalized for differences in borehole fluid, logging tool, and/or neutron source between the before-frac and after-frac logs.

16. The method of claim 14 wherein in the comparing step, the count rate difference is obtained by subtracting after-frac log data from before-frac log data.

17. The method of claim 14 wherein the count rate difference that is lithology and/or borehole condition independent is computed and utilized at multiple depths traversed by the borehole.

18. For use in conjunction with a fractureable subterranean formation traversed by a borehole, a well logging method comprising the steps of:

performing across a well interval a first after-frac logging operation and a second after-frac logging operation with one or more logging tool apparatuses having a neutron emitting source and a plurality of thermal neutron or capture gamma ray logging detectors located at different distances from the neutron emitting source, wherein performing the first and the second after frac-logging operations comprises moving the one or more logging tool apparatuses through the borehole and generating in at least two of the detectors a first after-frac log, a second after-frac log, a first after-frac count rate, a second after-frac count rate, a first after-frac count rate ratio, and a second after-frac count rate ratio;

computing a count rate ratio differential between the first after-frac count rate ratio and the second after-frac count rate ratio;

utilizing the computed count rate ratio differential to compute a corresponding count rate differential between the first and the second after-frac logs that is due to a hydrogen index change between the first and the second after-frac logs;

correcting one of the first and the second after-frac count rates from one of the same two detectors for the hydrogen index change using the computed count rate differential to generate a corrected count rate;

comparing the corrected count rate with the other one of the first and the second after-frac count rates in the correcting step to develop a count rate difference between the first and the second after-frac count rates which is independent of at least one of lithology and borehole conditions; and using the count rate difference to indicate a change in the heights and locations of high thermal neutron capture cross-section material-containing proppant in the formation fractures and/or in the borehole region adjacent the fractured formation in the time interval between the first and second after-frac logs.

19. The method of claim 18 wherein in the performing step the generated first and second after-frac count rate ratios and first and second after-frac count rates are corrected/normalized for differences in borehole fluid, logging tool, and/or neutron source between the first and second after-frac logs.

20. The method of claim 18 comprising computing the count rate differential at multiple depths traversed by the borehole.

21. The method of claim 18 further comprising producing a fluid from the well in a time interval between the first and the second after-frac logging operations.

22. The method of claim 18 wherein the utilizing step uses a relationship between the first or second after-frac log count rate and the corresponding first or second after-frac log count rate ratio in an interval of the well which does not contain tagged proppant.

23. For use in conjunction with a fractureable subterranean formation traversed by a borehole, a well logging method comprising the steps of:

performing a before-frac logging operation and an after-frac logging operation with one or more logging tool apparatuses having a neutron emitting source and a plurality of thermal neutron or capture gamma ray logging detectors located at different distances from the neutron emitting source, wherein performing each of the before-frac and after-frac logging operations comprising moving the logging tool apparatus through the borehole and respectively generating a) a before-frac near detector count rate log and a before-frac far detector count rate log ("BF count rate logs"), and b) an after-frac near detector count rate log and an after-frac far detector count rate log ("AF count rate logs");

generating a before-frac near/far-count-rate-ratio-log ("BFN/F ratio log") based on the BF count rate logs;

generating an after-frac near/far-count-rate-ratio-log ("AFN/F ratio log") based on the AF count rate logs;

generating Corrected count rate logs by correcting at least one of the BF count rate logs and the AF count rate logs to account for any changes in one or more of borehole fluid, logging tools, and neutron source output between the before-frac and after-frac logging operations;

generating a Corrected ratio log by correcting either the BFN/F ratio log or the AFN/F ratio log to account for any changes in one or more of borehole fluid, logging tools, and neutron source output between the before-frac and after-frac logging operations;

comparing the AF ratio log or the BF ratio log to the corresponding Corrected ratio log to determine near/far count rate ratio differentials ("N/F ratio differentials");

computing near detector and/or far detector count rate differentials as lithology-independent and/or borehole condition independent, and hydrogen index-corrected count rate differentials based on the determined N/F ratio differentials;

combining the computed near detector and/or far detector count rate differentials with the Corrected BF count rate logs—to yield modified before-frac near detector and/or far detector count rate logs that are a lithology-independent and/or borehole condition independent and hydrogen index-corrected before-frac count rate logs; and comparing the modified before-frac near detector and/or far detector count rate logs with the corresponding AF count rate logs to determine the heights/locations of high thermal neutron capture cross-section material-containing proppant in formation fractures and/or a borehole region adjacent to the fracturable subterranean formation.

* * * * *